(12) United States Patent
Goodell et al.

(10) Patent No.: US 7,300,894 B2
(45) Date of Patent: Nov. 27, 2007

(54) COMPOSITES PRESSURE RESIN INFUSION SYSTEM (COMPRIS)

(75) Inventors: Barry S. Goodell, Bangor, ME (US); Roberto A. Lopez-Anido, Orono, ME (US); Benjamin Herzog, LaGrange, ME (US)

(73) Assignee: University of Maine, Orono, ME (US)

( * ) Notice: Subject to any disclaimer, the term of this patent is extended or adjusted under 35 U.S.C. 154(b) by 11 days.

(21) Appl. No.: 10/732,584

(22) Filed: Dec. 9, 2003

(65) Prior Publication Data

US 2004/0157519 A1    Aug. 12, 2004

Related U.S. Application Data

(60) Provisional application No. 60/437,358, filed on Dec. 30, 2002.

(51) Int. Cl.
*B32B 5/26* (2006.01)
*B32B 27/04* (2006.01)
*B32B 9/04* (2006.01)
*B32B 27/40* (2006.01)

(52) U.S. Cl. .................. 442/242; 442/279; 428/411.1; 428/424.2

(58) Field of Classification Search ................ 442/279, 442/242; 428/411.1, 424.2
See application file for complete search history.

(56) References Cited

U.S. PATENT DOCUMENTS

| | | | |
|---|---|---|---|
| 4,902,215 A | 2/1990 | Seemann, III | |
| 5,052,906 A | 10/1991 | Seemann, III | |
| 5,721,034 A | 2/1998 | Seemann, III et al. | |
| 5,904,972 A | 5/1999 | Tunis, III et al. | |
| 5,958,325 A | 9/1999 | Seemann, III et al. | |
| 6,054,205 A | 4/2000 | Newman et al. | |
| 6,159,414 A | 12/2000 | Tunis, III et al. | |
| 6,309,732 B1 | 10/2001 | Lopez-Anido et al. | |
| 2002/0151240 A1 | 10/2002 | Smith et al. | |

OTHER PUBLICATIONS

Beckwith et al.; "Resign transfer molding: A decade of technology advances"; *SAMPE Journal*, 1998, vol. 34, No. 6, pp. 7-19.

Larsen et al.; "Investigation of a two-stage injection process to reduce the effects of in-plane resin flow," *AIAA-2002-0026*, Montana State University, Bozeman, Bozeman, MT, pp. 1-7.

Abraham, D., et al., "A comparison of physical properties of glass fibre epoxy composites produced by wet lay-up with autoclave consolidation and resin transfer moulding," *Composites Part A*, 29A (1998) 795-801, Elsevier Science Ltd.

*Primary Examiner*—Lynda Salvatore
(74) *Attorney, Agent, or Firm*—Townsend and Townsend and Crew LLP

(57) ABSTRACT

The present invention provides resin infused composite articles. Also provided is a method for preparing the composite articles of the invention. The method includes infusing the assembled components of the composite with resin under pressure. There are also provided numerous devices of varying configuration that are of use in the methods of the invention.

19 Claims, 17 Drawing Sheets

COMPOSITES PRESSURE RESIN INFUSION SYSTEM (COMPRIS)

BACKGROUND OF THE INVENTION

Current resin transfer molding (RTM) processes are used to produce Fiber Reinforced Polymer (FRP) composite materials by infusing resins into different types of fiber reinforcement (Beckwith and Hyland, "Resin transfer molding: A decade of technology advances", SAMPE Journal, Vol. 34, No. 6, November-December, pp. 7-19 (1998)). RTM methods are characterized by resin infusion of fiber reinforcement, fabrics or preforms within a closed mold or tool. RTM methods have the advantage of minimizing void content, producing high fiber volume content and controlling volatile organic compound (VOC) emissions. Resin infusion is attained by a pressure gradient that can be developed in three different ways: 1) by vacuum; 2) by external pressure and/or gravity; and 3) by a combination of vacuum and pressure.

Among the family of RTM processes, the subset known as Vacuum Assisted Resin Transfer Molding (VARTM) has shown great potential for fabricating FRP composite parts (Beckwith and Hyland 1998). However, the VARTM process requires two stiff molds to produce composite laminates. Construction of a Modular fiber reinforced polymer composite structural panel system using the VARTM process is presented in U.S. Pat. No. 6,309,732.

The SCRIMP™ process constitutes an improvement over VARTM for fabrication of large composite parts. In the SCRIMP™ process only a one sided tool is required and a vacuum is applied to infuse the fiber reinforcement inside a vacuum bag. The SCRIMP™ technology relies upon the controlled flow of resin through an in-plane distribution system. The resin distribution system allows dry fiber reinforcement layers to be infused with resin throughout the cross-sectional thickness. Two SCRIMP™ patents, U.S. Pat. No. 4,902,215 and No. 5,052,906, specifically address the use of a flow medium fed by a "pervious conduit" (a resin feed or channel) communicating with the flow medium (TPI Technology, Inc. (2001). An Overview of the SCRIMP™ Technology, Warren, R.I.). The SCRIMP™ technology also includes the use of core materials with resin flow features. This technology is described in U.S. Pat. Nos. 5,721,034, 5,904,972, 5,958,325 and 6,159,414.

The quality of composite parts prepared by art-recognized methods is dependant on several processing parameters (e.g., resin distribution media, vacuum setup, part geometry and thickness, resin/catalyst chemistry). Since, the maximum vacuum that can be applied in the SCRIMP™ process is approximately 1 Atmosphere (30 in of Hg or −15 psi), the ability of the technique to infuse FRP composite laminates and hybrid composite parts with different substrates is limited based on the distribution media. Furthermore, since the SCRIMP™ process requires dedicated labor to properly set up the distribution media and seal the vacuum bag avoiding gas leaks, it is relatively slow and expensive for mass production of composite parts.

One group (Larsen et al. AIAA-2002-0026) has employed a 2-stage process using a bag and, two-part mold to produce an FRP specifically for wind turbine blades. In the first stage of their process, a vacuum is applied similarly to the SCRIMP™ process to draw in and infuse an article or part with resin. The article or part is not consolidated to allow better resin infiltration into the fabric of the FRP. In a second stage, the two parts of the mold are closed and a low pressure of 55-10 kpa (8-15 PSI) is applied to the impregnated fabric to further distribute the resin along the length of the article. Higher clamping or consolidation pressures applied were said to reduce performance of the system, and were prohibitive given the design considerations of the mold used. The Larsen system does not use an initial application of pressure to infuse resin into a substrate or reinforcing layer. Moreover, the Larsen system is not disclosed to be applicable to systems that do not make use of a two-part mold or form.

In general, RTM processes can be modified so that the fiber reinforcement can be bonded to other substrate or core materials to develop hybrid composite products. In this case, the polymeric matrix serves both as a fiber binder and adhesive to a substrate. The substrate is not infused with the resin but rather the polymeric matrix bonds to the substrate surface. Examples of substrate or core materials are foams, cellular materials, ceramics, steel, wood products and Portland cement concrete. When these hybrid composite products are used in structural applications, failure typically develops at the substrate/FRP composite interface.

The present methods of fabricating resin infused composites are hampered by their inability to form graded interfaces between components of composite materials and also because vacuum systems create defects in the final material as localized low pressures cause microvoids due to volatilization of solvents in the resin. Moreover, currently used methods, e.g., RTM, require the use of expensive and complicated fabrication equipment. Thus, a simple, inexpensive method for forming a composite material with a graded interface and improved quality, would substantially improve the art of composite material formation.

BRIEF SUMMARY OF THE INVENTION

The present invention provides a process for the fabrication of composite materials in which resin is delivered into a unit that contains at least a portion of one component of an article. Unlike methods presently used to form composite materials, the instant composite pressure resin infusion system (ComPRIS) relies on the application of pressure to infuse the resin into an article's part or parts contained within the unit, bringing the resin into intimate contact with the contents of the unit.

The ComPRIS process can be described in three-separate stages, as follows:

Stage 1 is the placement of the components of the article including the fiber reinforcement and the substrate, laminations or core if applicable. This stage can be conducted with or without exterior clamping pressure. At this stage, no contact of these materials with resin has occurred.

Stage 2 is the delivery of resin to the fiber reinforcement and the substrate, laminations or core, if applicable. Delivery of resin takes place inside the unit (pan, box or collapsible bag). The resin delivery can be performed before or after the article is placed in or immersed in the pressure system. In the case of using a collapsible bag, the delivery occurs after the article is placed inside the pressure system and it is aided by a pressure gradient. At the end of the second stage, the resin remains uncured.

Stage 3 is the application of pressure to the article within the confines of the pressure system. In this stage resin is infused into components of the article. Although not necessary in many applications, three mechanisms to assist resin distribution can be used: venting to the exterior of the pressure system, using a permeable substrate that acts as a buffer or bladder, or creating channels, texturing or kerfing on the substrate surface. When not using a collapsible bag, clamping pressure may be applied either before, during, or after resin infusion. In the third stage the resin cures or sets and forms one or more polymer matrix layers or components of the article.

The ComPRIS process can be used to infuse essentially any composite material article, e.g., fiber reinforcement, furnish, or laminates, and bond a variety of substrate or core materials. The process is particularly suited to the development of a strong interphase or interfacial bond when the article substrate material is permeable to the resin.

An interphase is a functionally graded region of bonding, and for the remainder of this document the term 'interphase' refers to the bondline created by the ComPRIS process including both interface and true interphase bonds. Generally speaking, 'interphase' refers to a "3-dimensional bondline", while 'interface' refers to a "2-dimensional bondline". The extent of the bondline in the third dimension (created by the ComPRIS process) will depend upon the permeability of the article substrates. The 3-dimensional bondline created by permeation of the resin into one or more components of the composite article results in a functionally graded material of high quality without vacuum induced defects including microvoids. It results in penetration of the resin into the fiber reinforcement layers, furnish or laminates, as well as into the adjacent substrate or core material to provide a gradual transition between the two dissimilar materials, thus greatly improving fracture toughness of the interface compared to current fabrication processes with abrupt "glue-line" interfaces, in which the resin essentially does not permeate either of two facing components of the composite article. The use of pressure also negates the development of micro gas voids in the resin or part that occur when vacuum processes are used. The extent of resin permeation can be controlled, resulting in materials having predictable and improved properties and reduced interface problems (Herzog, B., Goodell, B., and Lopez-Anido, R. "Electron Microprobe Imaging for the Characterization of Polymer Matrix Composites" Submitted for publication 2003). The process is applicable to bonding and infusing both similar and dissimilar materials. For example, the process can be used to laminate permeable or impermeable materials whether these materials are used in combination or separately, and this can be done using a one-step infusion.

An additional advantage of the ComPRIS process is that resin infiltration into the substrate article or core material provides dimensional stability to the substrate allowing the final product to resist hygrothermal contraction or expansion. Moreover, the present invention allows blending and integration of the properties and dimensional stabilities of dissimilar materials to produce greater uniformity throughout the final product.

Where preconsolidated permeable or semipermeable materials are used as part of the article, entrapped gas may be compressed in these articles such as would occur in a bladder or buffer material. Entrapped gas in voids of the article, either created or generated as part of a desired fabrication process, or entrapped inadvertently, can be compressed in the permeable or semipermeable material thus allowing resin infiltration into another more critical or targeted portion of the article or laminate. In some cases, entrapped gas is voided from the article as part of the process, and in others entrapped gas may be compressed into one or more subcomponents of the article to produce desirable features in the final product, or to allow improved penetration of a resin or resins in another part of the article. In any case, gas microvoids are not created within an infiltrating resin, but only in portions of a preconsolidated component or laminate of the article which either naturally, or through engineering design, is intended to possess voids or microvoids.

The method of the present invention provides a number of advantages absent from currently used processes. For example, the process allows fast production of FRP composite laminates and hybrid composite products with minimal material waste and VOC emissions. Gas or vapor microvoids created by vacuum are not created within the resin because a vacuum is not applied during the infusion process. This allows for improved structural properties of resin infused parts. Furthermore, the substrate article or core material can be laminated or consolidated at the same time that it is reinforced with fiber preforms (e.g., one-step production of glued laminated wood with fiber reinforcement). A higher quality and consistency of infusion occurs because pressure is used rather than vacuum. Moreover, since the ComPRIS processing parameters can be accurately controlled (e.g., minimal material property variation, consistent fiber volume ratio of an FRP layer, and minimal gas void content), the method of the invention provides high-quality FRP composite materials with properties that are reproducible from batch to batch. The ComPRIS process also requires significantly fewer fabrication supplies (e.g., tubing, vacuum bag, distribution media, sealants) compared to existing RTM process such as SCRIMP™. The process also produces minimal resin waste; the volume of resin required to fabricate a selected material is readily calculable (e.g., the amount of resin necessary to embed fiber preforms or fabrics and to penetrate permeable substrates), and excess uncured resin can be recovered prior to curing. Methods currently in use do not allow for the recovery of excess uncured resin.

In addition, the ComPRIS process provides composite materials in which the strength of the bond between the various composite components meets acceptable standards and exceeds that of current FRP composite bonding methods. The materials or articles produced by the method of the invention include laminated and fiber composite materials, as well as materials or articles that are both laminated and fiber reinforced. For example, composite laminates can be sandwiched between two or more substrate materials (e.g., polypropylene sheet, wood-plastic board, etc.), providing multiple laminates simultaneously.

The articles produced can also include long structural members with or without constant cross-section (e.g., glulam beams). Composite materials with long cross-sections or which are irregularly shaped can be fit into an appropriately configured pressurizable system, or pressure bag, autoclave, or other similar pressure vessel. Moreover, the articles fabricated can include infused laminates with heavy or dense tows (e.g., carbon or glass) and also with 3-D reinforcement (e.g., needle punch fabrics) that VARTM processes normally cannot penetrate.

The invention also provides a kit for preparing a composite material of the invention. The kit will generally consist of one or more components of a device useful in the methods of the invention and instructions for assembling and/or using the device to fabricate a composite material of the invention. In another embodiment, the kit further includes one or more component of the composite material. The kit may also include only an instruction set and one or more component of a composite article to be fabricated according to a method of the invention.

Other objects, embodiments and advantages of the present invention will be apparent from the detailed description that follows.

DETAILED DESCRIPTION OF THE INVENTION

Abbreviations and Definitions

Figure 1:
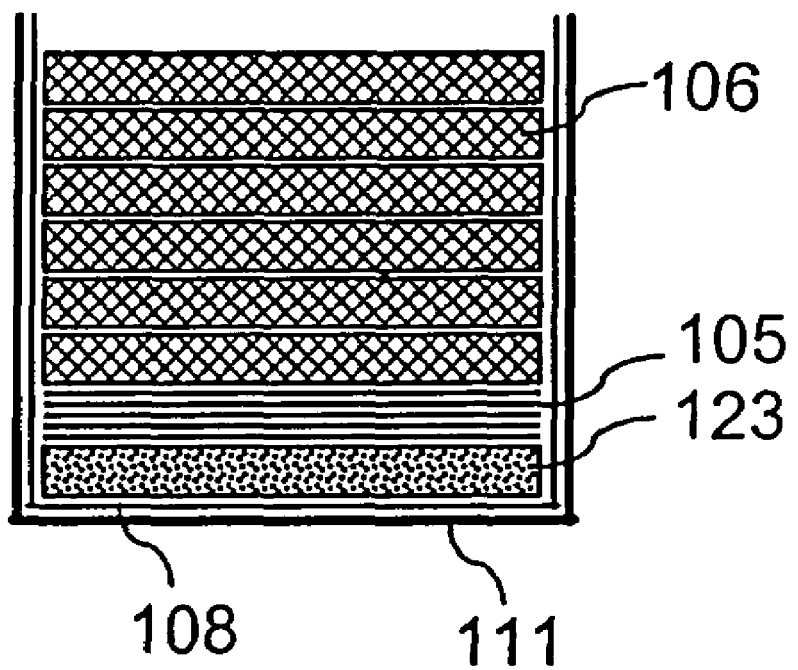
FIG. 1 is a cross-sectional view of an apparatus for practicing a method of the invention.

Composite pressure resin infusion system (ComPRIS); Volatile organic compounds (VOC); Resin transfer molding (RTM); Fiber reinforced polymer (FRP).

The terms "billet" and "article," are used interchangeably herein to refer to both the final product of the process set forth herein as well as the precursors of the final product (laminations, fabric, fiber, etc) prior to or during the infusion of resin.

The term "component," as used herein, refers to a section of an "article" or "billet" that is contacted with uncured resin. Exemplary "components" include substrates and reinforcing materials. Components may be monolithic or they may be composed of one or more substructures, e.g. a laminate.

The term "unit" refers to the box, bag or other container that holds the "article". An exemplary unit acts merely to contain a portion of the article being fabricated and does not serve as a "mold" or "form" such as those used in conventional RTM processes.

The term "pressure system" is used to refer to the pressure vessel, autoclave, bag, cylinder, closed mold or other pressurisable system, or a means of effecting pressure such as liquid submersion, and allows gas or liquid pressure to be applied to the resin and "article" within the "unit".

The term interphase refers to both a discrete interface bondline as well as a three-dimensional graded bond developed during the ComPRIS process.

"Polymer matrix layer", as used herein, refers to a polymer matrix layer made of a polymer matrix composite material. A polymer matrix composite material includes a thermoset or thermoplastic resin with fibers and/or additives and/or fillers and/or other constituents. The resin in a polymer matrix composite is in a solid, or cured, or set state. A polymer matrix layer has a geometric configuration that can be in the form of a solid 3-dimensional component, or a layer or a lamination or a flat sheet or a curved sheet or a shell or a skin. The resin in the polymer matrix layer acts as a binder for the fibers and/or additives and/or fillers and/or other constituents. The resin in the polymer matrix also acts as an adhesive that bonds to a substrate or a lamination or a layer.

The term, "peel ply" refers to a removable fabric ply applied or layered on the surface or interior of all, or a component of an article. A peel ply provides a clean finished surface, or a chemically clean surface for bonding, when it is removed. Peel ply can also be used to allow two or more components of an article to be separated after fabrication is complete. Peel plies are designed to be peeled from the surface following cure or set to leave a smooth or a textured surface, which is clean and contaminant free. This surface may then be prepared for secondary bonding, filling or painting. Peel plies are made from polyamide (nylon), polyester, or aramid, but are not exclusive to these materials.

The term "effluent port" refers to a means by which excess resin is drained, evacuated or ejected from the unit prior to curing or setting of the resin remaining in the unit.

The term "BPM" refers to a bladder or buffer permeable material. This could be wood, flax, hemp, jute, kenaf, stone, concrete, or porous or perforated plastic or metal. It is material that resin and gases will penetrate through to sublayers or to an interior void or void layers. An example of such BPM void layers would be the porous cellular structure of air-dry wood. Penetrating air or gases will compress in the BPM when the article is pressure infused with resin. The penetrating resin may help to reinforce the BPM as a part of the final article, or alternately the resin may penetrate into the matrix or void region of the BPM for extraction and potential recovery of said BPM penetrating resin. The BPM may be part of the laminations or core of the article in some applications.

"Microvoid", as used herein refers to a region in which cured or set resin is absent or present in a lesser amount than the cured or set resin surrounding the region. Cured resin that is "essentially free of microvoids" refers to a cured or set resin that is essentially uniform and defect-free. A cured resin or polymer matrix "essentially free of microvoids" should be contrasted with a cured resin produced by a vacuum-based infusion method such as SCRIMP™, in which the resin or a solvent in which it is dissolved "boils" or ablates when the vacuum is pulled, generating microvoids as defects. In the composite articles of the invention in which microvoids are present, the microvoids are preferably below 10 microns, more preferably below 5 microns in diameter.

"Cured" resin, or "curing" of resin, refers to the act of gelling, or setting, or solidification of a thermoset, thermoplastic, or other resin that is initially infused into an article in liquid or flowable form.

The term "clamping" mean to press, clamp, gravity weight, centrifugally compress, lash, band, nail-, screw-, or bolt-laminate, rivet, pin, compress by means of a collapsible container (e.g., a bag) or otherwise consolidate components of the article to bring these components closer together or to reduce gas voids.

Introduction

The present invention provides resin-infused composite articles and methods of making these articles. The method (ComPRIS) infuses resin into an article that contains at least a portion of one component of the composite material. The ComPRIS process may be used with essentially any combination of materials, e.g., natural fiber materials to produce a laminate product, or a composite product such as a laminated wood beam, composite strand, flake, and fiber or furnish products (with or without synthetic fiber reinforcement layers).

In contrast to presently utilized methods of forming composite materials, which utilize vacuum infusion, the method of the present invention infuses the resin into the article under pressure that is applied within a pressure system that contains the unit and article. The method of the invention provides numerous advantages over current methods including, but not limited to, simplifying the fabrication set up, reducing waste and VOC emissions, reducing or eliminating microvoids that develop in components and laminates fabricated using vacuum (VARTM based) processes, and providing laminated articles that include graded interphases between the components of the laminates. Moreover, the articles or materials produced by the methods of the invention have desirable properties that are not achievable with presently used methods.

The Embodiments

As discussed above, the present invention provides both composite materials and methods for making those materials. Exemplary aspects and embodiments of the materials and methods of the invention are discussed herein.

Composite Materials

In a first aspect, the invention provides a composite material that includes a first substrate layer, and a first cured polymer matrix layer in contact with the first substrate layer. The cured polymer matrix layer includes a cured resin and a reinforcing material in contact with the cured resin. In a preferred embodiment, the polymer matrix layer is essentially devoid of bubbles, microvoids and other flaws that typically result from the use of vacuum to contact a sub-component of a composite material with a resin.

In a presently preferred embodiment, a first amount of the cured resin impregnates the first substrate layer and/or the reinforcing material. In exemplary embodiments, the cured resin impregnates the first substrate to a depth of from about 1% to about 100%, more preferably from about 10% to about 80%, of the substrate cross-section. The invention also provides the option of preselecting the amount of resin that impregnates one or more components of the composite article. Impregnation of the substrate or reinforcing layer with the resin is generally accomplished by the application of pressure to an article that includes the substrate, the reinforcing material and the resin.

In another exemplary embodiment, the composite material of the invention further includes a second substrate(s) in contact with the polymer matrix layer or resin. As discussed above in the context of the first substrate, the second substrate is optionally impregnated with resin.

An exemplary composite material of the invention includes a first substrate layer that comprises a first sub-component of the article and a second sub-component in a layered arrangement. An amount of resin generally is in contact with the first sub-component and said second sub-component prior to pressure infusion. The invention provides composite articles in which the first substrate and the second substrate are the same material or different materials. Moreover, the composites of the invention include those materials in which the first sub-component and said second sub-component are the same material or different materials.

In materials that include more than one substrate and/or more than one sub-component, the resin preferably impregnates at least one substrate or sub-component, forming a graded interphase between at least two components of the composite article. The presence of a graded interphase can, for example, mitigate material failure due to shear at an interlaminae interface. Where some of the material substrates are impermeable, a graded interphase will not be achieved in these materials. However, the ComPRIS process does not use vacuum to infuse the resin, and therefore will not produce vacuum-induced defects; and superior bond line development is therefore produced.

In a preferred embodiment, the strength or structural performance of the material of the invention is greater than the sum of the strengths or structural performances of each of its component parts. For example, in one embodiment, each of the components of the material has a characteristic dimensional stability. The dimensional stability of the material of the invention is greater than the sum of the characteristic dimensional stabilities of each of the components of the material.

Any natural or synthetic resin that sets or is curable from a flowable to a solid or semi-solid state is of use in the present invention. Exemplary resins of use in the present invention include epoxy-based resins, phenol-resorcinol-formaldehyde, isocyanate, emulsion-polymer/isocyanate, and phenol-formaldehyde, vinyl-based resins, vinyl ester-based resins, epoxy vinyl ester-based resins, polyolefin-based resins, polystyrene-based resins, polyvinyl chloride-based resins, polyamide-based resins, polyester-based resins, polyacetal-based resins, polycarbonate-based resins, polyaromatic ether or thioether-based resins, polyaromatic ester-based resins, polysulfone-based resins, urethane-based resins, polyphenol-based resins, polyethylene-based resins, polypropylene-based resins, melamine, melamine urea, and other melamine based resins, and acrylate-based resins.

The polyolefin-based resins include, for example, homopolymers and copolymers of α-olefins, such as ethylene, propylene, butene-1,3-methylbutene-1,3-methylpentene-1,4-methylpentene-1; and copolymers of such α-olefins with other copolymerizable, unsaturated monomers. Specific examples of the resins include polyethylene-based resins such as high-density, middle-density or low-density polyethylene, linear polyethylene, ultra-high molecular polyethylene, ethylene-vinyl acetate copolymer, ethylene-ethyl acrylate copolymer; polypropylene-based resins such as syndiotactic polypropylene, isotactic polypropylene, propylene-ethylene block or random copolymer poly-4-methylpentene-1.

The styrene-based resins include, for example, homopolymers and copolymers of styrene and α-methylstyrene; and copolymers thereof with other copolymerizable, unsaturated monomers. Specific examples of the resins include general polystyrene, impact-resistant polystyrene, heat-resistant polystyrene (x-methylstyrene polymer), syndiotactic polystyrene, acrylonitrile-butadiene-styrene copolymer (ABS), acrylonitrile-styrene copolymer (AS), acrylonitrile-polyethylene chloride-styrene copolymer (ACS), acrylonitrile-ethylene-propylene rubber-styrene copolymer (ASS), acrylic rubber-acrylonitrile-styrene copolymer (AAS), etc.

The polyvinyl chloride-based resins include, for example, vinyl chloride homopolymers and copolymers of vinyl chloride with other copolymerizable, unsaturated monomers. Specific examples of the resins include vinyl chloride-acrylate copolymer, vinyl chloride-methacrylate copolymer, vinyl chloride-ethylene copolymer, vinyl chloride-propylene copolymer, vinyl chloride-vinyl acetate copolymer, vinyl chloride-vinylidene chloride copolymer, etc. These polyvinyl chloride-based resins may be post-chlorinated to increase their chlorine content, and the thus post-chlorinated resins are also of use in the invention.

The polyamide-based resins include, for example, polymers as prepared by ring-cleaving polymerization of cyclic aliphatic lactams, such as 6-nylon, 12-nylon; polycondensates of aliphatic diamines and aliphatic dicarboxylic acids, such as 6,6-nylon, 6,10-nylon, 6,12-nylon; polycondensates of m-xylenediamine and adipic acid; polycondensates of aromatic diamines and aliphatic dicarboxylic acids; polycondensates of p-phenylenediamine and terephthalic acid; polycondensates of m-phenylenediamine and isophthalic acid; polycondensates of aromatic diamines and aromatic dicarboxylic acids; polycondensates of amino acids, such as 11-nylon.

The polyester-based resins include, for example, polycondensates of aromatic dicarboxylic acids and alkylene glycols. Specific examples of the resins mentioned are vinyl ester, polyethylene terephthalate, and polybutylene terephthalate.

The polyacetal-based resins include, for example, homopolymers, such as polyoxymethylene; and formaldehyde-ethylene oxide copolymers to be obtained from trioxan and ethylene oxide.

The polycarbonate-based resins include, for example, 4,4'-dihydroxy-diarylalkane-based polycarbonates. Examples include bisphenol A-based polycarbonates prepared by phosgenation of bisphenol A, or by interesterification of bisphenol A with dicarbonates such as diphenyl carbonate. Also of use are modified bisphenol A-based polycarbonates, in which the bisphenol A moiety is partly substituted with 2,2-bis(4-hydroxy-3,5-dimethylphenyl)propane or 2,2-bis(4-hydroxy-3,5-dibromophenyl)propane; and flame-retardant, bisphenol A-based polycarbonates.

The polyaromatic ether or thioether-based resins have ether or thioether bonds in the molecular chain, and their examples include polyphenylene ether, styrene-grafted polyphenylene ether, polyether-ether-ketone, and polyphenylene sulfide.

The polyaromatic ester-based resins include, for example, polyoxybenzoyl obtained by polycondensation of p-hydroxybenzoic acid; polyarylates obtained by polycondensation of bisphenol A with aromatic dicarboxylic acids such as terephthalic acid and isophthalic acid.

The polysulfone-based resins have sulfone groups in the molecular chain, and their examples include polysulfone obtained by polycondensation of bisphenol A with 4,4'-dichlorodiphenylsulfone; polyether-sulfones having phenylene groups bonded at their p-positions via an ether group and a sulfone group; polyarylene-sulfones having diphenylene groups and diphenylene-ether groups alternately bonded via sulfone group.

The acrylate-based resins include, for example, methacrylate polymers and acrylate polymers. Exemplary monomers for these polymers include, for example, methyl-, ethyl-, n-propyl-, isopropyl- and butyl-methacrylates and -acrylates.

The polyolefin-based resins for the acid-modified polyolefin-based resins include, for example, polypropylene, polyethylene, ethylene-α-olefin copolymers, propylene-ethylene random-copolymers, propylene-ethylene block-copolymers, ethylene-a-olefin copolymer rubbers, ethylene-α-olefin-non-conjugated diene copolymers (e.g., EPDM), and aethylene-aromatic monovinyl compound-conjugated diene copolymer rubbers. The α-olefins include, for example, propylene, butene-1, pentene-1, hexene-1, and 4-methylpentene-1, and one or more of these are of use either singly or as combined.

The phenolic and polyphenolic based resins include, for example, phenol formaldehyde based resins, phenol resorcinol based resins, and phenol resorcinol formaldehyde resins.

As specific examples of the unsaturated carboxylic acids and their derivatives to be used for modifying the resins, mentioned are unsaturated carboxylic acids such as acrylic acid, methacrylic acid, maleic acid, fumaric acid, itaconic acid, crotonic acid, citraconic acid, sorbic acid, mesaconic acid; as well as acid anhydrides, esters, amides, imides and metal salts, such as maleic anhydride, itaconic anhydride, citraconic anhydride, methyl acrylate, methyl methacrylate, ethyl acrylate, butyl acrylate, monoethyl acrylate, acrylamide, maleic acid monoamide, maleimide, N-butylmaleimide, sodium acrylate, sodium methacrylate.

In the invention, the resins mentioned above may be used either singly or as combined. In a presently preferred embodiment, the resin is selected from thermoset polymers, thermoplastic polymers, ultraviolet (UV) and light curable resins, and combinations thereof.

Reinforcing materials used in the articles in the present invention include, but are not limited to, rods, grids, matrices, preforms, sponges and fibers. Exemplary materials of use in the invention include, but are not limited to, glass fibers, ceramic fibers such as boron fibers, silicon carbide fibers, alumina fibers, silicon nitride fibers, zirconia fibers, calcium silicate fibers, rock wool; inorganic fibers such as magnesium oxide fibers, magnesium oxysulfate fibers, magnesium hydroxide fibers, gypsum fibers; metal fibers such as copper fibers, brass fibers, steel fibers, stainless steel fibers, aluminum fibers, aluminum alloy fibers; organic fibers such as polyethylene fibers, polypropylene fibers, aramide fibers, polyarylate fibers; natural fibers and carbon fibers. One or more type of fiber or other reinforcing material is employable herein either singly or combined.

Exemplary fibers include preforms, woven fabrics, non-woven fabrics, stitched fabrics, braids, rovings, tows, chopped strand mats, continuous strand mats, veils and combinations thereof.

The fibers of use in the invention are optionally surface-treated with coupling agents to improve the interaction between the fiber and the resin. Exemplary coupling agents include silane and titanium coupling agents, such as tri-ethoxysilane, vinyltris(β-methoxyethoxy)silane, γ-methacryloxypropyltrimethoxysilane, γ-glycidoxypropyltrimethoxysilane, β-(1,1-epoxycyclohexyl)ethyltrimethoxysilane, N-β-(aminoethyl)-γ-aminopropyltrimethoxysilane, N-β-(aminoethyl)-γ-aminopropylmethyldimethoxysilane, γ-aminopropyltriethoxysilane, N-phenyl-γ-aminopropyltrimethoxysilane, γ-mercaptopropyltrimethoxysilane, γ-chloropropyltrimethoxysilane, γ-aminopropyltrimethoxy silane, γ-aminopropyl-tris(2-methoxy-ethoxy)silane, N-methyl-γ-aminopropyltrimethethoxysilane, N-vinylbenzyl-γ-aminopropyltriethoxysilane, triaminopropyltrimethoxysilane, 3-ureidopropyltrimethoxysilane, 3-4,5-dihydroimidazolepropyltriethoxysilane, hexamethyldisilazane, N,O-(bistrimethylsilyl)amide, N,N-bis(trimethylsilyl)urea, etc.

Exemplary titanium coupling agents include isopropyltriisostearoyl titanate, isopropyltridodecylbenzenesulfonyl titanate, isopropyltris(dioctylpyrophosphate)titanate, tetraisopropylbis(dioctylphosphite)titanate, tetraoctylbis(ditridecylphosphite)titanate, tetra(1,1-diallyloxymethyl-1-butyl)bis(ditridecyl)phosphite titanate, bis(dioctylpyrophosphate)oxyacetate titanate, bis(dioctylpyrophosphate)ethylene titanate, isopropyltrioctanoyl titanate, isopropyldimethacrylisostearoyl titanate, isopropylisostearoyldiacryl titanate, isopropyltri(dioctylphosphate)titanate, isopropyltricumylphenyl titanate, isopropyltri(N-amidoethyl, aminoethyl)titanate, dicumylphenyloxyacetate titanate, and diisostearoylethylene titanate.

The surface treatment of fibers with a coupling agent may be effected in any ordinary manner. For example, the fiber is optionally coated using a sizing treatment, applying a solution or suspension of the coupling agent in an organic solvent to the fibers. Other methods include dry mixing or spraying.

Of the reinforced product of the invention, the fiber content of the polymer matrix component of the article is generally from 10 to 90% by volume, preferably from 20 to 80% by volume, more preferably from 30 to 70% by volume when the reinforcing fibers are either organic or inorganic.

In a preferred example, at least one component of the composite article includes a preservative material, e.g., pesticides such as fungicides, or insecticides. The preservatives may be selected from solid, or water-borne, and oil-borne preservatives.

In a preferred embodiment for these systems, a preservative or fire retardant chemical is applied to substrates or laminates that contain wood or other natural or synthetic products that are subject to fire or thermal degradation; or biodegradation, attack, infestation, or surface colonization by microorganisms, insects or other pests. The substrate, fiber reinforcement layers, laminates, and/or any combination of these may be pretreated with fire retardant or preservative chemical and a subsequent ComPRIS process will then allow the preservative system to be encapsulated within the composite article.

Currently preferred fire retardants or preservatives are those that can be mixed into the resin system, and the ComPRIS process will carry the resin, as well as the preservative, into the substrate, fiber reinforcement layers, laminates, and/or any combination of these in the article.

In another exemplary embodiment, a dried or powdered diffusible fire retardant or preservative chemical, such as borate (sodium octaboratetetrahydrate or similar borate forms) is introduced into holes or gaps machined into middle plane of the laminates of the substrate or article. Resin infiltration into the article will retard moisture penetration into the laminates (if the product is exposed to moisture), and the resin alone may greatly enhance microbial degradation resistance and fire resistance. Protective treatment will still be required in some cases though and if the product becomes wetted it will undergo bio-deterioration like other conventional laminated materials made from biodegradable substrates. Likewise, the product may still burn if involved in a fire. The resin shell however will retain a diffusible preservative chemical or a fire retardant in the interior of the beam or billet where the preservative or fire retardant will protect the substrate if it should become wetted or be involved in a fire, respectively. Further exemplary preservatives and fire retardants are provided in, for example, American Wood Preservers Association Standards (2002); "Encyclopedia of Chemical Technology," John Wiley & Sons, New York, N.Y. and "*Wood Deterioration and Preservation: Advances in Our Changing World*", Oxford University Press.

The Method

The invention provides a method for fabricating a composite material. The methods of the invention allow for a range of large to small part fabrication, and find use in the field composite article manufacture of, e.g., marine fabrication, including the advantages of fabricating sandwich panels; aerospace fabrication, including the advantages of attaining microvoid free, very high fiber volume content polymer matrix layers; biomedical fabrication, including the advantages of integrating sensors and devices into composite parts; and transportation fabrication, including the advantages of fabricating curved surfaces and integration of thermoset and thermoplastic composites.

The methods of the present invention are of use in the structural reinforcement of wood products; sandwich construction for panels and linear elements; integration of dissimilar materials by creating a functionally graded interphase; development of integrated 3-dimensional structures with reduced processing steps; automated fabrication with minimum labor requirements; and closed fabrication systems with minimum VOC emissions.

Thus, in a second aspect, the invention provides a method of making a composite material. In an exemplary embodiment, the composite material or article includes a cured resin, and a reinforcing material in contact with the cured resin.

The method includes contacting the reinforcing material with uncured resin (i.e., a precursor of the cured resin), forming a precursor of the composite material ("article"). Pressure is then applied to the article, thereby dispersing a first amount of the uncured resin within the reinforcing material. The uncured resin is then cured, thereby forming the composite material.

In a further aspect, the invention provides a method of making a composite material that includes a first substrate layer, and a first cured polymer matrix layer in contact with the first substrate layer. The first cured polymer matrix layer includes a cured resin, and a reinforcing material embedded in the cured resin. A first amount of the cured resin impregnates the first substrate layer.

The method of making the composite article includes contacting the substrate with an uncured resin, thereby, surrounding, contacting, or partially embedding the reinforcing material in the uncured resin, providing a precursor of the composite article. Pressure is applied to the precursor of the composite article. The application of pressure optionally impregnates the first substrate with a first amount of the uncured resin. The uncured resin is subsequently cured, thereby forming the composite article.

As discussed in the preceding section, the substrate article may be fabricated of any appropriate material in any useful configuration. In an exemplary embodiment of the method, the substrate article includes a first sub-component that is laminated to a second sub-component. In this embodiment, the method described hereinabove further includes, forming an inter-sub-component layer of the uncured resin between the first sub-component and the second sub-component. The inter-sub-component layer is optionally formed essentially simultaneously with the process of dispersing the resin within the reinforcing material of the substrate. Upon curing, the resin forms an inter-sub-component layer of cured resin that bonds the first sub-component to the second sub-component.

In an exemplary embodiment, one or both of the first sub-component and the second sub-component is impregnated with uncured resin, which is subsequently cured, forming a graded interphase between the first and second sub-component. The properties and advantages of graded interphases are discussed elsewhere.

In an exemplary embodiment, a rigid, or a hinged, flexible, collapsible, or articulated device ("unit") used in the ComPRIS process is constructed. Typically for a simple laminated product, this is an open top, rectangular metal or plastic unit that closely fits the size of the final billeted article, for example a beam, to be produced. The resin may be delivered (via pressure or gravity feed) into the un-pressurized unit and the unit filled to a specified level prior to the application of pressure. The resin may be cured through the use of a chemical catalyst or promoter or both. Radio frequency, microwave, gamma radiation, UV light, or other methods that can cure, or heat the resin may alternately be applied through delivery systems built into the unit, or external to the unit. Temperature differentials in the resin and/or the medium, or fiber reinforcement layers, the fiber reinforcement and the substrate or core material, the substrate laminates, or any combination of these materials in the article may be applied to cause the resin to set or react to cure. The unit is constructed to allow physical pressure or clamping to be applied to the medium, or fiber reinforcement layers, the fiber reinforcement and the substrate or core material, the substrate laminates, or any combination of these materials of the article to consolidate or bring these materials in contact with each other before, during, or after a resin (adhesive or bonding resin) has penetrated all or parts of the article. Similarly, the unit is designed for placement in a pressure system which supplies gas or liquid pressure to force the liquid resin into the medium, or fiber reinforcement layers, the fiber reinforcement and the substrate or core material, the substrate laminates, or any combination of these materials of the article before, during, or after consolidation occurs. The interior walls of the unit are optionally prior coated with a release agent to limit bonding of the selected resin system to the unit, or the unit may be lined with materials that do not bond to the adhesive.

In another exemplary embodiment, the composite is contained within a unit such as a collapsible device (e.g., a bag), which is collapsed around the component. The bag is generally similar to those utilized in RTM processes with vacuum, to consolidate or debulk the dry fiber reinforcement layer and the substrate or core materials. A pressurization (rapid or slow depending on the setup conditions) of the pressure system is optionally used to collapse the bag around the substrate and core materials of the article. As an alternative, a temporary initial vacuum may be applied to collapse the bag prior to application of pressure. An important aspect of the use of a vacuum is that it can be used initially as an alternative to the use of the pressure system, but if used, the initial, temporary vacuum is not used to infuse the resin or to draw, inject or otherwise penetrate resin into the article. Therefore, in an exemplary embodiment, approximately ⅓ of an atmosphere is applied (8-10 in Hg) in the bag. Unlike RTM processes, the initial temporary vacuum, if desired, is preferably only used to collapse the bag around the substrate and core materials. If the use of the vacuum, as opposed to simply using pressure, is desired, a reduction in applied vacuum compared to current resin infusion processes still provides important simplifications and cost savings in sealing and handling the bagging materials. The vacuum process eliminates gas in the bag and confines the enclosed fiber reinforcement layers and substrate or core materials of the article.

In a preferred embodiment, the use of the collapsible bag eliminates the use of clamping, nail laminating, or other physical pressing of the fiber reinforcement layers and substrate or core materials of the article within the unit. The resin is delivered via a tube or conduit into the unit through means of a pressure differential between the pressure over a resin reservoir located within the pressure system, and the unit or bag—which is, in turn, vented to an atmospheric pressure region. The resin reservoir is subject to the pressure within the pressure system or is constructed to allow the pressure inside the pressure system to equalize with the pressure of the resin reservoir. Since, the pressure differential created in the article using this embodiment can be of an order of magnitude higher than applied vacuum in current resin infusion process (for example SCRIMP™), no resin distribution media is required.

In certain embodiments, a combination of vacuum and pressure may be applied. For example, if it is desired to obtain a maximal loading of resin in a porous or permeable substrate such as wood, a vacuum may be drawn first to reduce the vapor pressure of gas in voids within the substrate. If the evacuation is followed by pressure, an increased loading of resin in the substrate results.

If less penetration is desired in any of the embodiments of this patent, a less porous substrate (e.g., spruce vs. southern pine) may be used or, alternatively, a semipermeable coating may be applied to the wood or porous media surface.

In another example of a preferred embodiment the article will be placed into a unit containing resin, and the unit placed within a pressure system, an autoclave, or other pressure vessel, and pressure applied to force resin into the article in this manner. Prior to introduction of the resin to the unit, the resin may have been mixed with a chemical catalyst to promote polymerization of the resin following the pressure penetration phase. The resin, with or without catalyst may also be cured using heat, light, or the high frequency energy systems, or radiation sources as described above. Following cure of the resin, the composite material may be removed or separated from the unit, so that the unit can be used again. In the case of resin systems that have not had catalyst added, minimum resin waste can be achieved as no cured resin will remain in the lines of the unit or in an external reservoir. The closed nature of this system greatly reduces any VOCs that are released during the use of resins in other FRP composite production processes.

In another example, the article and uncured resin are contained within a unit that includes a movable or articulated component, e.g. a press member, to consolidate or clamp the component. For example, an opening in the unit (e.g., a top lid, a side opening, or a cover) is installed last, compressing the laminate or substrate stock of the article that has been placed within the unit. The cover or lid is optionally constructed such that when fully fitted and sealed, it will apply force to the laminates and bring them in close contact or consolidate them, and/or consolidate them together with a fiber reinforcement material. Resin, added before or after this consolidation is then used to impregnate the component, bringing the resin and the component into intimate contact, resulting in complete or partial impregnation of the component with the uncured resin depending on what is desired. Variables such as the amount of pressure, the amount of consolidation, the permeability of the component parts, semipermeable and impermeable coatings applied to component parts may all affect and permit a desired degree of penetration of resin into one or more component parts.

As an alternative, in an open unit, the laminates or other components of an article may be pressed, clamped, gravity weighted, centrifugally compressed, lashed, banded, nail-, screw-, or bolt-laminated, riveted, pinned, etc. to effect this consolidation. Either before or after the laminates or article is placed into the unit, liquid resin will be introduced. The components of the article may be consolidated either before or after the resin is introduced. After consolidation and resin introduction, pressure via the pressure system is then applied, and the resin will penetrate between laminations, and/or into the substrate, and/or into the fiber reinforcement layers, or any combination of these. As long as the resin pressure exceeds the pressure of the clamping or consolidation pressure, penetration of the laminates and/or substrate material(s) of the article will result. A pressure release port may be used to allow gas in the unit to escape allowing resin to penetrate some void areas between laminates or other gaps in the article more readily prior to or during the application of high pressure. A hole or holes bored into the article and tapped to the atmosphere may be used with this system to eliminate entrapped gas in the interior of laminates, FRP layers, furnish layers, or other composite or solid substrate material. Alternately grooves, ridges, kerfed areas, dimpled or ridged surfaces, or other surface topography modifications of the internal components of the article may be employed to allow entrapped gas to be released from the article prior to or during the application of pressure.

The surface of the composite optionally retains a thin layer of the cured resin. The article surface may be textured if desired by texturing the interior walls of the unit. Color or tinting may also be added to the resin if desired to produce a deep penetrating colored finish to the final product. The interior surfaces of the unit containing the components or the article and in contact therewith, may be either smooth or patterned. When an interior surface is patterned, it is optionally used to impress that pattern upon a component of the material of the invention.

The systems set forth herein may be used with a "peel ply" which will allow excess resin material to be readily removed from the outside of the composite after curing, or the unit system can be constructed with a non-bonding surface (or have a release agent applied to the surface to eliminate bonding so that the exterior surface of the composite article retains the surface texture of the unit (smooth, textured or other) to provide a desired surface appearance or texture.

In another embodiment, an article of the invention is fabricated with a peel ply between one or more components of the article. The presence of the peel ply allows the components of the article to be separated after fabrication. Thus, it is generally preferred that the peel ply used in this embodiment is a permeable fabric to which the resin does not adhere well.

An example of the use of a peel ply to provide an article having separable components is the fabrication of a curved or recurved article, e.g., a boat hull. In an exemplary embodiment, a permeable material or bladder or buffer permeable material (BPM), having the mirror image of the desired curved or recurved article is coated with a peel ply, and a layer of reinforcing material. The resin infusion process of the invention is then utilized to impregnate the reinforcing material with a resin, which is subsequently cured. During the infusion process, the permeable material acts as a bladder or buffer, absorbing gas that is forced out of the reinforcing material during the pressure infusion process of the invention. After the resin is cured, the permeable material is optionally maintained in contact with the peel ply, which is in contact with the remainder of the article. The permeable material or the BPM can served to protect the article from damage during handling, shipping, storage, etc. The permeable material or the BPM may be removed from the article when desired by removing the peel ply, which will separate both the peel ply and the permeable material from the article. Alternately, the resin in the reinforcing material may be cured and be allowed to remain uncured in the BPM. This excess resin may then be collected, drained, or extracted from the BPM for recovery and/or later re-use.

In another exemplary embodiment, the method makes use of a pressure system that includes at least one port that is of use for venting pressure, excess resin, VOCs, heat, etc. For example, it is within the scope of the method to charge the unit with an uncured resin, and after the resin and a component or components of the article are in intimate contact and desired resin penetration has occurred, the excess uncured resin may be drained or ejected from the pressure system prior to curing the resin. This method is appropriate when uncatalyzed resins are used and the resin is cured using methods other than catalyst mixing prior to introduction into the unit. Radio frequency curing is one example of this type of curing. Thus, the invention provides a method for avoiding resin waste. Moreover, if the excess uncured resin is removed prior to curing, the product produced requires fewer post-production processing steps to remove excess cured resin.

In another embodiment, at least one component of the article includes a vent hole. The vent hole is preferably attached to a vent line that operatively communicates with a region outside the pressure system used to apply pressure to the article. Thus, excess pressure build up within the article is conveniently vented outside of the pressure system. A valve on the line is optionally used to control the flow of gas out of the pressure system and this can be used to control and stop resin flow, and also can be used to improve the quality of the resin penetration by eliminating gas entrapment.

In another embodiment, the pressure system used is one where submersion in water or other liquids at an appropriate depth provides the hydrostatic pressure on the unit or bag to infuse resin into at least one component of the article. This method of applying pressure is particularly appropriate when large parts or articles are being infused and cannot be placed in conventional pressure vessels because of size limitations.

In another embodiment, rigid laminates or other internal components of the article may be grooved, ridged, kerfed, dimpled, have striated surfaces, or otherwise be modified in surface topography allow entrapped gas to void from the article prior to or during the application of pressure. Thus entrapped gas build up within the article is conveniently vented outside the article into the atmosphere beyond the pressure system. In some cases altering the orientation of the article will aid in allowing gas to escape as less dense entrapped gas will tend to rise while denser flowing components such as the resin will seek lower sites.

In an exemplary embodiment, a resin reservoir unit is utilized to hold the resin that impregnates the fiber reinforcement layer and the substrate or core materials of the article. A pressure gradient is generated between the article and the vent outlet (vented to lower pressures or to atmospheric pressure) within the pressure vessel or beyond the pressure system. As an example, the gas outlet can be a ⅛" hole bored down (or up or laterally) through the center of the laminate cross sections (excluding bottom laminate). Trapped gas can escape to the atmosphere through a vent tube fitted to the top of the hole. The seal does not have to be perfect, but adequate to create the pressure differential. Penetration through the fabric layers proceeds rapidly and the penetrating resin eventually displaces escaping gas in the hole. Preferably, the hole negligibly reduces strength; no more than typical small pin knots in wood, or minor defects in other natural or synthetic structural products.

The vented port tube may be a thick walled rubber pressure tube sealed into the top of the central vent hole in the laminates and connected to one of the vent holes in the door or walls of a pressure vessel or autoclave or the tube may extend to the atmosphere in other pressure systems.

Exemplary methods of the invention are further understood by reference to the figures appended hereto. In the methods and devices exemplified by the figures, the ComPRIS process utilizes a pan ("unit") system capable of holding either all, or a portion of article including but not limited to: a) the fiber reinforcement to be impregnated with resin; 2) the fiber reinforcement in combination with substrate or core materials, or consolidated laminates, or other furnish or composite materials, or 3) the substrate material laminations or furnish alone. The unit may be configured to contain enough resin to completely infiltrate the final product article, or it may hold only enough to infiltrate a desired portion of the final product article. Other configurations of the unit, and modifications of the described methods that employ modifications of the unit will be apparent to those of skill in the art. Moreover, such configurations and modifications are within the scope of the present invention.

A first embodiment of the invention is described with reference to FIG. 1. In this exemplary embodiment, components of the article including the substrate, laminations or core 106 and fiber reinforcement 105 are placed in unit 111 prior to consolidation. Either before or after consolidation, liquid resin is then delivered to the unit to allow this resin to contact the sides of the substrate and fiber reinforcement. The vessel is then pressurized forcing the resin into intimate contact with the components of the article.

In an exemplary embodiment, the unit 111 is a rigid, flexible, or articulated container. Physical pressure may also be applied to the bottom, or sides or top of the unit container (if the container is hinged with a top and/or sides) to help consolidate the substrate and fiber material of the article. In an exemplary embodiment, physical pressure is applied to the top or sides of the substrate or fiber material thereby consolidating the substrate and fiber material. The unit container may be flexible or elastomeric, as the unit walls do not form a mold to form the article. Rather, the article's final shape is defined primarily by the structural parts (laminates, core material, etc) of the precursor article components. The unit only holds resin in contact with the article components during pressure infusion of the resin, and when physical pressure is applied to one or more walls of the unit, it functions as a clamp, weight, or fastener to consolidate internal components of the article. In some embodiments, when excess resin is drained away after pressure infusion of the article, the unit functions only initially in holding resin in contact with the article, and also functions to consolidate internal components of the article. The inside surfaces of the unit may be embossed, etched, or otherwise fabricated to produce a textured surface on the final cured resin which coats the substrate and fiber reinforcement of the article in some embodiments.

The substrate, laminations or core of the article are contained within the unit. In an exemplary embodiment, components of the article are produced from pre-consolidated materials, such as one or more wood laminations, composite boards, and previously impregnated and cured FRP composite layers. Further examples of these types of materials include a porous or perforated, or partially porous or perforated substrate such as wood, plastic, concrete or stone. Another example of the material is metal or plastic, or perforated metal or plastic, preferably which accepts resin bonding or resin penetration at its surface and still more preferably allows penetration of the resin into one or more sub-surface layers or voids. The material may consist of one uniform layer or multiple layers or substrate materials.

Examples of fiber reinforcements 105 of an article are discussed above, and include glass (e.g., E-glass), carbon, graphite, aramid, boron, basalt, wood and plant fibers. Other useful natural and synthetic based fibers are listed in "Encyclopedia of Chemical Technology," John Wiley & Sons, New York, N.Y. The fiber reinforcement can be in the form of woven fabrics, non-woven fabrics, stitched fabric, braids, rovings, tows, chopped strand mats, continuous strand mats, preforms, veils, or a stack of layers made of any combination of these. Furthermore, the fiber reinforcement can be two or three-dimensional. Other examples of fiber reinforcement are: steel and other metals, ceramic, plastics and other structural materials that have been fiberized or made permeable to accept resin or other liquid penetrants. An exemplary reinforcing fiber is E-glass unidirectional woven fabric, such as VEW 260 from BTI-Saint Gobain.

The embodiment according to FIG. 1, and other embodiments of the present invention, may optionally include a release film 108 inserted between the billet and the unit or layered on the surface of the unit. An exemplary release film is a thin, flexible and impermeable material that does not bond to the cured resin or resin-substrate matrix. This material is generally removed from the final product and could also be removed from the unit.

The product article fabricated using the device and method according to FIG. 1, and in other methods of the present invention, optionally includes an outer lamination or bumper 123, which is preferably a component of the substrate, laminations, or core of the article and is optionally bonded to the fiber reinforcement as one of two or more laminations of the article. The outer lamination or bumper may be desirable for use as a structural feature, or as a decorative feature, or simply to use to consolidate and protect the fiber reinforcement from damage after fabrication when the part is transported or in use. This component can also be a fire retardant coating or a material that imparts fire resistance to the part.

Either before or after assembly of the arrangement displayed in FIG. 1, the resin is introduced, to be in contact with the billet or article. The unit is filled with resin and the entire article including the zone between all substrate laminates is then impregnated with resin when pressure is applied in the pressure system (not shown), thus allowing, for example, both laminated beam fabrication and FRP fabric infiltration in one resin infusion step. Once the unit is filled with resin to an appropriate level and is inside the pressure system, the pressure is increased to allow the resin to penetrate the article. Typically the applied pressure ranges from about 10 psi to about 300 psi, but is not limited to this range. Appropriate pressures are readily determined on a material-by-material basis.

The ComPRIS process is applicable to a wide range of thermoset polymer resins. Furthermore, the process is applicable to thermoplastic polymers. When using these materials, heat is optionally applied directly to a pressure vessel, the unit, or alternatively, the substrate laminates or fibers may be heated, e.g., electrically, conductively, or through other means, to reach or exceed the melt point, for example, of a thermoplastic polymer. The liquid polymer is then infused into the fiber reinforcement layers, laminates or furnish when pressure from the pressure system is applied. An exemplary thermoset resin of use in the instant invention is an epoxy-based vinyl ester resin, e.g., Derakane 411-C50 from Dow Chemical.

Whether or not a thermoset or thermoplastic polymer is used, heat may be applied to the unit or its contents by any method recognized in the art. For example, heat may be generated through conventional convection or conduction processes, via radiation sources, or using a radio frequency, microwave, or other high frequency energy sources to cure the resin component of the system. This may be done with or without a chemical catalyst in the resin system.

The resin is optionally cured when it is under pressure in the pressure system, e.g., in a pressure vessel or autoclave or submerged to provide hydrostatic pressure. One method for curing is achieved though the use of a chemical catalyst that promotes polymerization of the resin after pressure has been applied for a period long enough to produce the appropriate penetration of the resin into the article including the substrate core or laminates, fabric (reinforcing material), and any other components. Alternately, curing is achieved through the use of a chemically catalyzed, or an un-catalyzed resin with the use of heat, radiation or other energy. For example, curing can be achieved through the use of high frequency system such as microwave or radio frequency (RF) energy or potentially by exposure to gamma radiation source.

Figure 2:
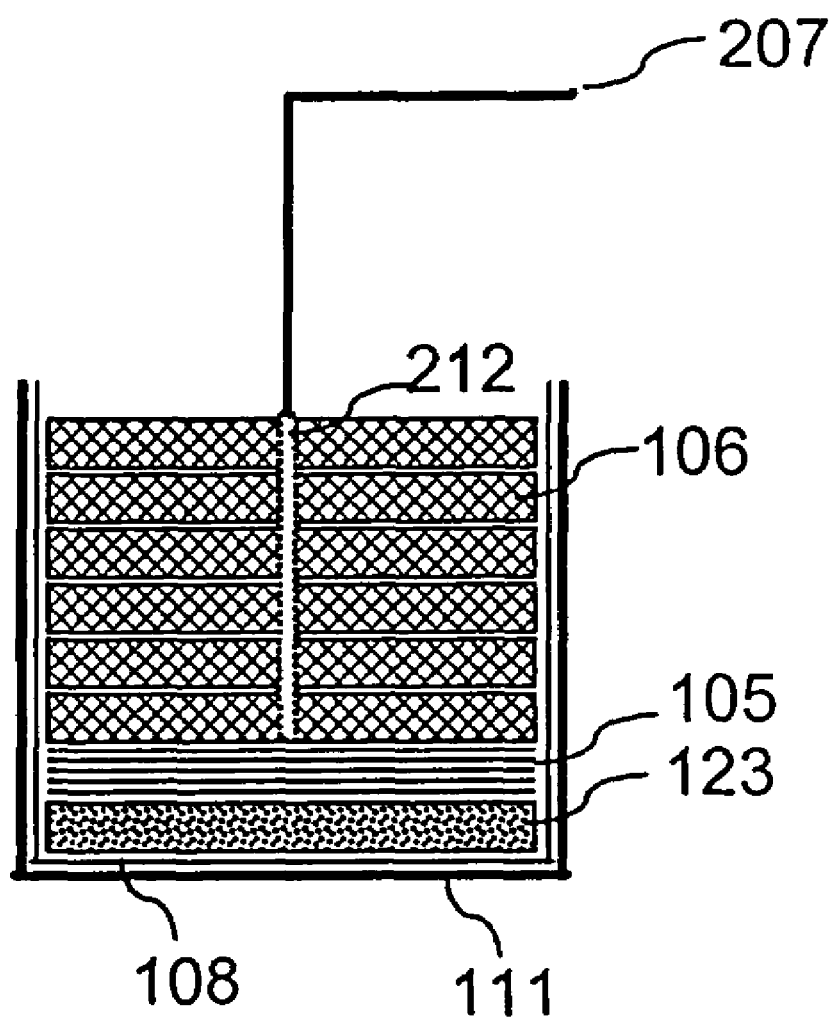
FIG. 2 is a cross-sectional view of an apparatus for practicing a method of the invention in which a pressure gradient within the article is attained by means of vent tube 207.

In another exemplary embodiment set forth in FIG. 2, the method utilizes an article as set forth in FIG. 1, which further includes vent 107. In a preferred embodiment, the vent connects the interior of the article with the ambient atmosphere beyond that of the pressure system. The vent may connect the article interior with a region of pressure that may range from being slightly lower than the pressure system to atmospheric pressure. The vent may consist of a tube, or a series or tubes, extending from the surface or interior of the article to a region outside a pressure vessel, or beyond the pressure system.

As set forth in the exemplary embodiment of FIG. 2, the vent may also extend into one or more components of the article being fabricated. The vent will preferably extend into the article via gas outlet 212. In an exemplary configuration, the gas outlet is a hole or a series of holes in the article that penetrates into one or more components, e.g., laminates, substrates or fiber layers of the article being fabricated. The hole is preferably configured to allow its connection to the vent. Simple contact of a hole in the article to one end of the vent, or a fitting attached to the vent, or any other means to attach the vent to the gas hole can be utilized in the present invention.

In this embodiment, the vent allows pressurized gas or liquid to vent or escape from the interior of the article to a lower pressure zone, allowing pressurized gas or fluid inside the article to be displaced by resin during the pressure process so that, where necessary, improved resin infiltration can occur. The venting apparatus may be used with articles composed of materials of a variety of permeabilities. In a preferred embodiment, the vent includes tubes or conduits that are used with materials of marginal permeability: when using relatively impermeable materials, resin infiltration is improved by removing trapped gas or fluid that may prevent adequate resin penetration.

In another preferred embodiment, a vent is utilized in conjunction with an article that includes at least one curved element.

Figure 3:
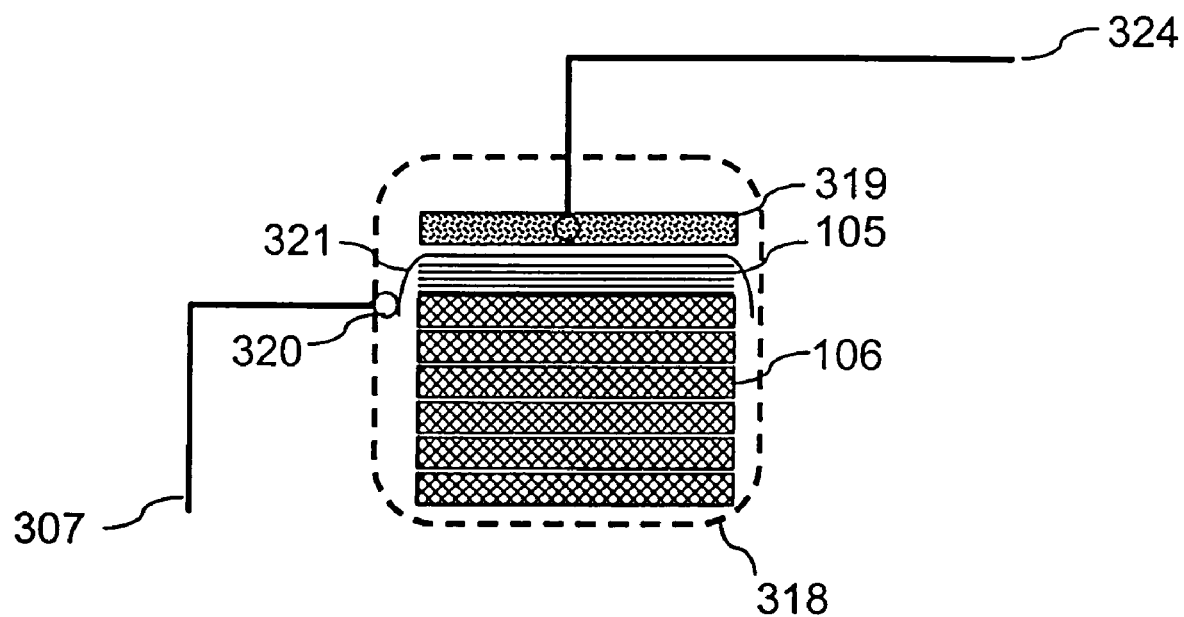
FIG. 3 is a cross-sectional view of an apparatus for practicing a method of the invention using a collapsible bag to apply a pressure gradient to the article.

In a further exemplary embodiment, according to FIG. 3, the process utilizes collapsible bag 318 as the unit. The bag may be constructed of any appropriate material or combination of materials. The bag may be a continuous sleeve, or a sheet with sealed ends. The components of the article are placed inside the bag, and the bag is sealed around both resin feed line 324 and pervious conduit 320. Other open regions of the bag are also preferably sealed prior to initiating the pressurization of the bag.

Pervious conduit 320 shown in FIG. 3 is preferably fabricated from a disposable, permeable or porous material, e.g., sisal rope. Pervious conduit 320 mediates the flow of resin along the surface or side of the fiber reinforcement or other permeable layer of the article. It also provides a means for entrapped gas to exit the article.

Resin movement through the article is driven by the pressure gradient toward pervious conduit 320. Pervious conduit 320 is connected to line 307. Once the article is infused, line 307 acts as a drain line, through which excess resin is removed. In certain embodiments of the ComPRIS process, the resin is delivered and pressure is applied until the article or a component of the article is penetrated with resin to the extent desired. The excess resin is then drained away from the article either while resin infusion pressure is maintained or during or after release of resin infusion pressure. Removal of the excess resin from contact with the article is preferably accomplished while the article is still under pressure but prior to the curing or setting of the resin. This procedure is particularly advantageous when the curing process involves the use of external energy, such as radio frequency curing. The curing energy or curing process can be initiated following removal of excess resin, and the excess resin can be collected and re-used or recycled.

In a further exemplary embodiment, peel ply 321 is utilized between the fiber reinforcement 105 and the resin distribution media 319. The peel ply material is preferably permeable, allowing resin to pass through the ply into contact with the components of the article in contact with each face of the ply. The ply is also of use to prevent the cured resin from bonding to resin feed lines or the collapsible bag.

The apparatus of FIG. 3 is further provided with a resin feed line 324, which delivers resin from a reservoir to the article within the sealed collapsible bag. The reservoir may be a chamber open, or partially open, to the pressure within the pressure system, especially when air or gas pressurization systems are used. Alternatively, the reservoir is a sealed bag or other sealed elastic, or collapsible or partially collapsible container. The sealed reservoir has particular application when it is desired to keep the pressurizing fluid (air, gas or water) from contact with the resin. In an exemplary embodiment, one end of 324 is in contact with the resin in a resin reservoir (not shown) and when pressure is applied within the pressure system, autoclave or pressure unit the pressure differential between the resin in the resin reservoir and article sealed in the collapsible bag forces the resin through the resin feed line to deliver resin to the article. The resin is carried along the resin feed line to the distal end that is sealed within the collapsible bag to deliver resin to the article being fabricated.

Figure 4:
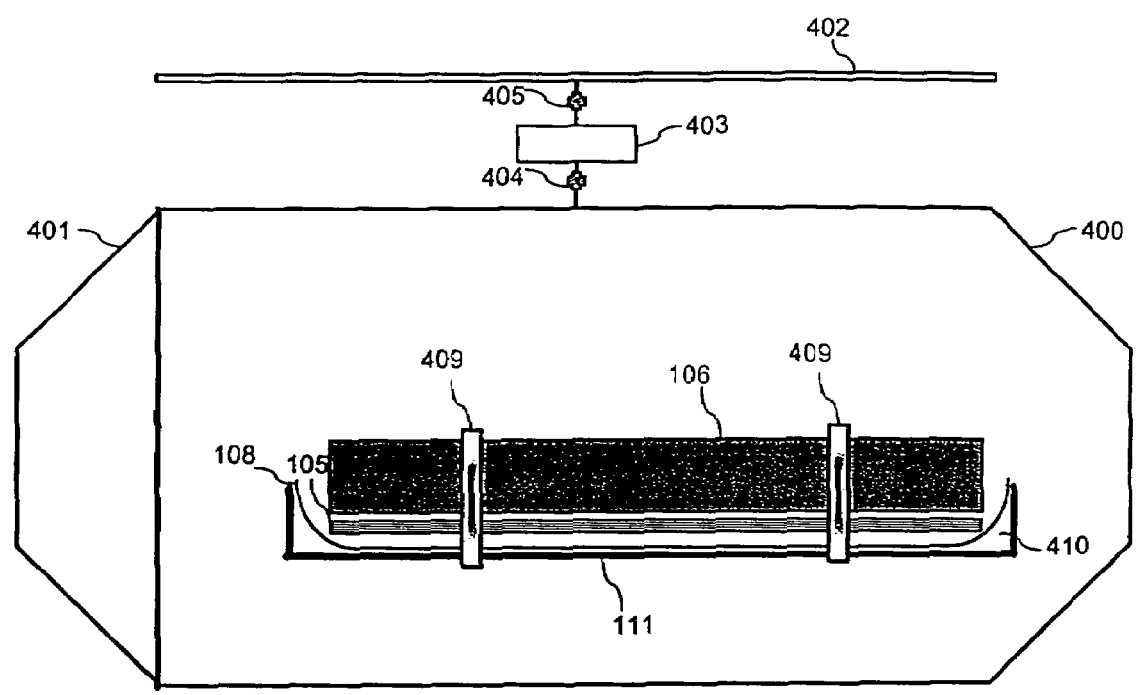
FIG. 4 is a cross-sectional view of an apparatus for practicing a method of the invention in which clamps are utilized to apply pressure to the article.

In a further exemplary embodiment of the ComPRIS system, illustrated by FIG. 4, only the lower portion of the article is infiltrated with resin. The lower portion of the article may include any arrangement of components of the article including, but not limited to, one or more substrate and one or more reinforcing layer.

Similar to the apparatus set forth in FIG. 1, in this embodiment, the article includes the substrate, laminations or core 106 and fiber reinforcement 105, which are at least partially contained in unit 111. The unit, loaded with the components of the article is contained within a pressurizing vessel 400 such as an autoclave or pressure vessel. The pressurizing vessel can be any pressurizable means capable of containing the rigid, flexible, or articulated unit as well as the article and associated tubes, pots, reservoirs, curing units, and other components that are utilized in the selected embodiment of the ComPRIS process. Pressurizing vessel 400 is preferably fitted with ports allowing the various gas pressure lines, optional vacuum line, access hatch(es), resin lines and tubes, vent lines and tubes, and other components to enter or exit the vessel, preferably, without compromising the pressure requirements. Alternately, the pressure system includes the submersion of the unit, loaded with the components of the article in water or other liquid or flowable media to a depth providing suitable hydrostatic pressure to infuse the resin into one or more components or the article.

In the case where an autoclave or pressure vessel is used, an example is illustrated in FIG. 4. The pressure vessel includes access hatch 401, which is a door or cover, that is bolted, clamped, sealed with a quick-fit hatch, or can be otherwise opened and closed to allow the insertion and extraction of unit 111 as well as the article and associated tubes, pots, reservoirs, curing units, and other components that may be needed for the ComPRIS process. The access hatch may also be used to insert or extract any curing devices such as a radio frequency curing unit, and for maintenance of any of the units, tubes, pots, reservoirs or valves. The access hatch, when sealed, allows pressure to be built up within the autoclave or pressure vessel.

The pressure vessel also includes a pressurizing manifold that includes pressure line 402, which delivers pressure from a pressure source, e.g., gas pressure, to the pressurizing vessel from an external source. Also included is pressure regulator 403, which is connected to 402. The regulator provides a means to control the pressure from the pressure source. This regulator may be controlled manually or electronically through remote or computer connections. Valve 404 allows the pressure to be turned off or on upstream of the pressure regulator. Valve 405 allows the pressure to be turned of or on downstream of the pressure regulator.

In the case where water or other liquid or flowable media is used to provide hydrostatic pressure for resin infusion, a pressure vessel or autoclave is not needed. Instead, the level of pressure desired is achieved by submersion, with increasing pressure requiring submersion of the unit, loaded with the components of the article and also including the resin and resin reservoir or bag with associated tubes, valves and traps, to greater depths.

For the application of physical pressure to the components of the article, the apparatus of FIG. 4 makes use of one or more clamps 409, which apply physical pressure to two or more sides (preferably top and bottom) of the article to consolidate laminates, including the fiber reinforcement and the substrate, laminations or core. The clamps are engaged by any means including, but not limited to, hydraulically, through screw pressure, and through weighted pressure.

The unit functions to contain the resin 410 as a resin reservoir. The unit maintains the resin in intimate contact with at least one surface of the article.

Figure 5:
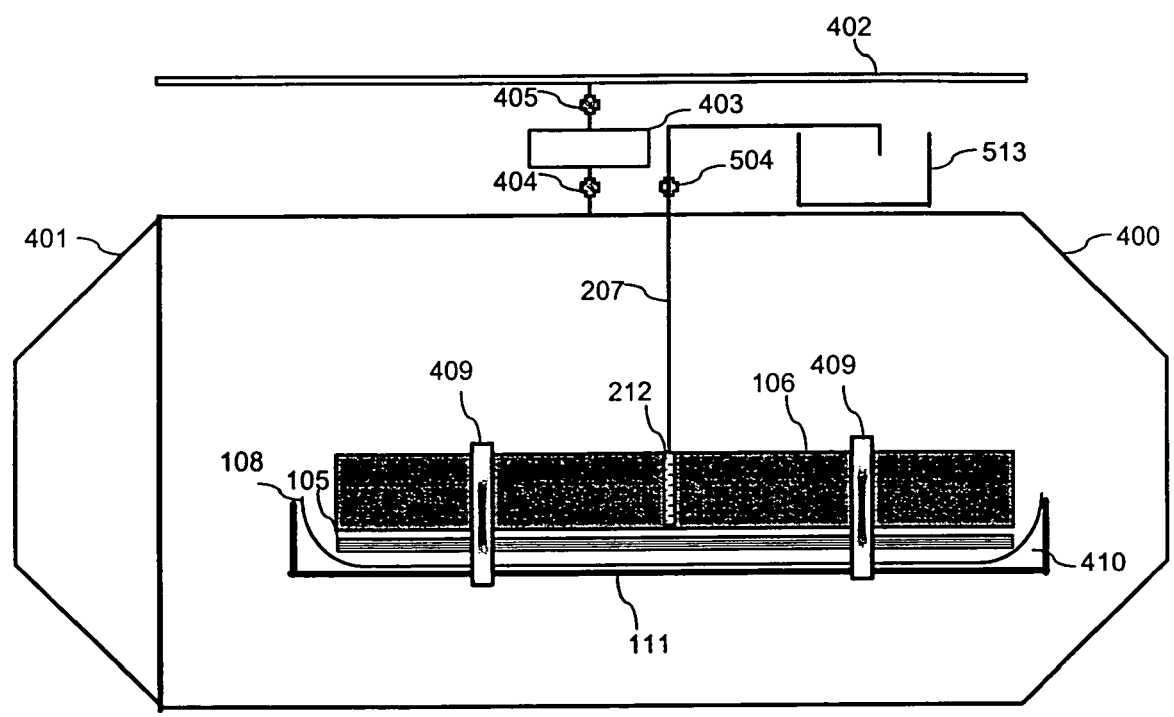
FIG. 5 is a cross-sectional view of an apparatus for practicing a method of the invention in which liquid venting is utilized to remove excess resin from the article.

FIG. 5 illustrates an exemplary embodiment of the invention in which the vessel of FIG. 4 is modified by the addition of pot 513, which is preferably maintained at atmospheric pressure or at a pressure lower than that experienced by the unit and the components or the article within the unit. The pot is useful to collect excess resin and other fluids that are displaced from the article during the ComPRIS process when gas or liquid venting is employed. It may be rigid and vented to a lower pressure region, or it may be sealed and expandable or elastic in structure. In one embodiment, the pot serves to collect liquid that overflows the apparatus upon application of pressure, when this occurs either intentionally or as a byproduct of gas venting. The apparatus is optionally further modified by including vent 207 and gas outlet 212. Liquid flow through vent 207 is controlled via valve 504.

Figure 6:
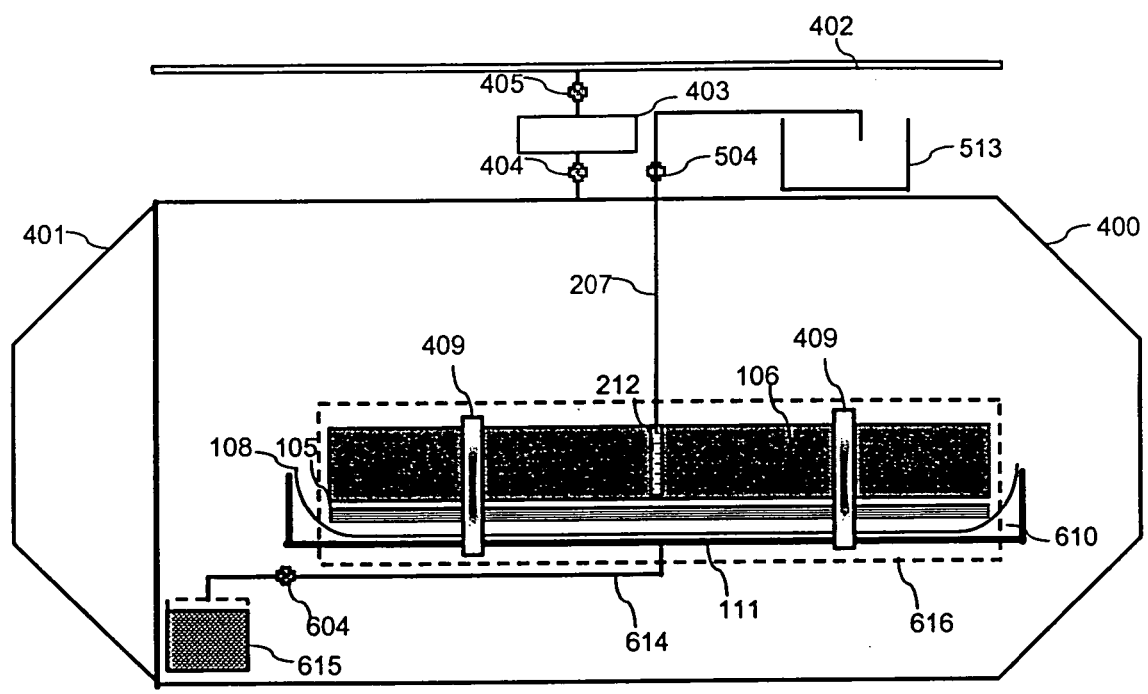
FIG. 6 is a cross-sectional view of an apparatus for practicing a method of the invention in which uncured resin is drained from the pan or vessel unit holding the article prior to curing the resin in contact with the article.

A further exemplary embodiment is displayed in FIG. 6. The apparatus of FIG. 6 is similar in design as that set forth in FIG. 5, with the addition of an uncured resin drain pot 615, which is connected to uncured resin reservoir 610 via uncured resin drain line 614. This pot may be rigid or expandable or elastic in structure. Liquid flow through line 614 is controlled via valve 604. The device optionally includes curing area 616. Exemplary curing devices of use in the curing area include radio frequency generators, such as two metal plates connected to an RF generator (either inside or outside the pressure chamber or autoclave), that apply RF energy to cure the resin in the article.

Figure 7:
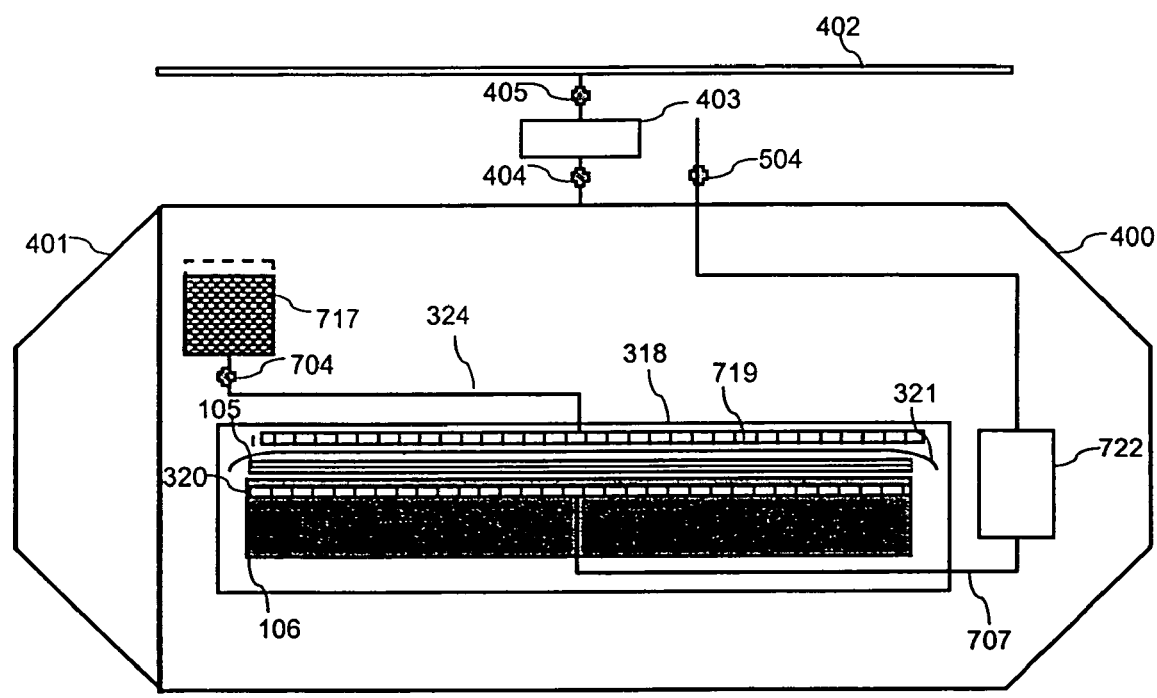
FIG. 7 is a cross-sectional view of an apparatus for practicing a method of the invention in which the uncured resin reservoir is maintained within the pressure vessel and a container for draining excess resin is maintained external to the pressure vessel.

FIG. 7 provides a diagram of another exemplary embodiment. The article is contained within collapsible bag 318, which is placed within a pressure vessel 401 or within another pressure system such as a water submersion pressure system (not shown). Resin reservoir 717 is contained within the pressure vessel or placed into the pressure system. Uncured liquid resin is contained within the reservoir. The flow of uncured resin from the reservoir is controlled by valve 704. In an exemplary configuration, where air or gas is the resin infusion pressure medium, the reservoir has an open top, or is ported to allow equilibrium with the pressure inside the pressure vessel. In another exemplary configuration where water or other liquid flowable medium is used as the resin infusion pressure medium, the reservoir may be a sealed elastic, or collapsible or partially collapsible container. When the pressure is applied, e.g., by gas pressure in a vessel or autoclave or by submersion of the article within the collapsible bag and the resin containing reservoir, resin is fed through resin feed line 324 to the article that is contained within the bag unit inside the pressure vessel.

Resin distribution media 719 is connected to the resin feed line 324. The resin distribution media 719 can be separated from the article with the use of peel ply 321 and then be disposed.

Resin distribution media 719 is a flow system or network composed of pervious lines or arteries and a porous fabric or net. An exemplary resin distribution medium a disposable, permeable or porous material, such as wire coil, permeable rubber matting, or perforated tubes that mediate the flow of uncured resin along the surface or side of the fiber reinforcement or other permeable layer of the part. The resin distribution media is optionally subjected to pressure gradients to aid the flow of uncured resin through the surface of the fiber reinforcement. The resin is fed from reservoir 717 through valve 704 and through resin feed line 324 to the article.

Figure 8:
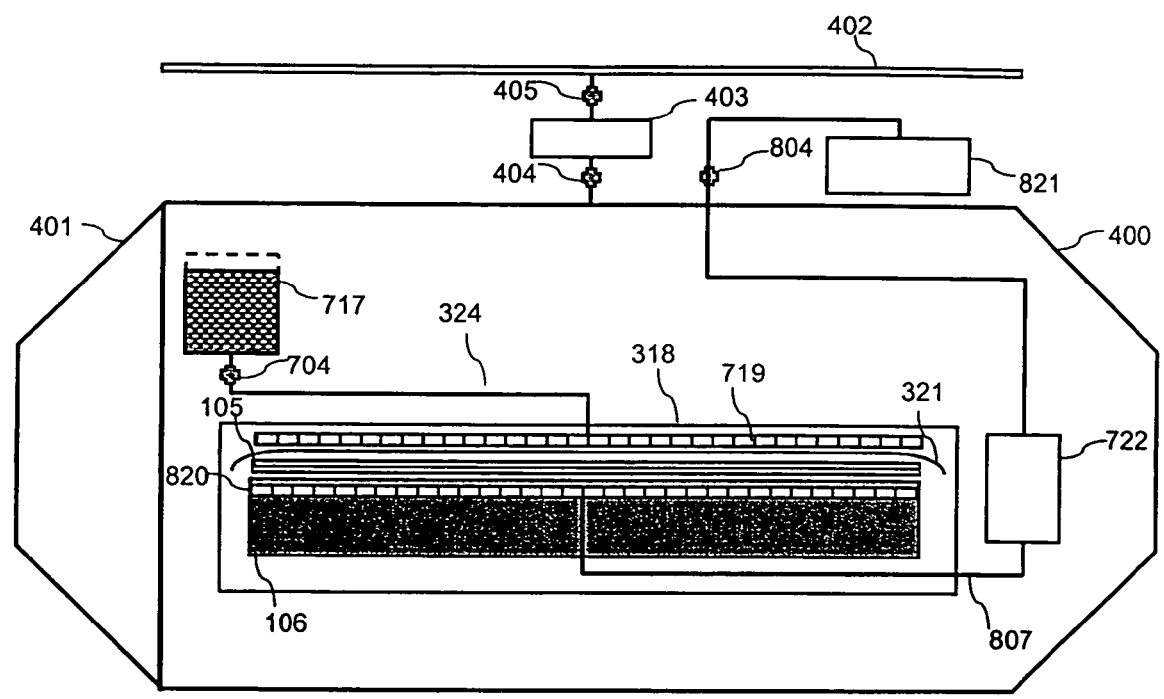
FIG. 8 is a cross-sectional view of an apparatus for practicing a method of the invention in which the device further includes a vacuum pump.

Pot 722 is used with the process setups shown in FIG. 7 and FIG. 8 and allows collection of excess resin from the article via line 707. Pot 722 may be rigid or expandable, collapsible, or elastic in structure.

In a still further exemplary embodiment (FIG. 8), the method utilizes a device such as that set forth in FIG. 7, with the addition of vacuum pump 821 that is utilized to place the collapsible bag under mild vacuum simply to collapse it. The amount of vacuum applied to the pressure means is controlled by valve 804. Uncured resin that is removed from the article by the vacuum is transferred to pot 722 via line 807. Line 807 is a vacuum line intended to initially collapse the bag 318 prior to pressurization. However, after the article is pressure infused with resin, line 807 acts as a drain line and the excess resin is trapped in pot 722. Pervious conduit 820 is a disposable, permeable or porous component, such as sisal rope, that mediates the flow of gas along the surface or side of the fiber reinforcement or other permeable layer of the article. Pervious conduit 820 is generally able to withstand the application of a one-third atmosphere vacuum. Pervious conduit 820 is connected to vacuum/drain line 807.

Figure 9:
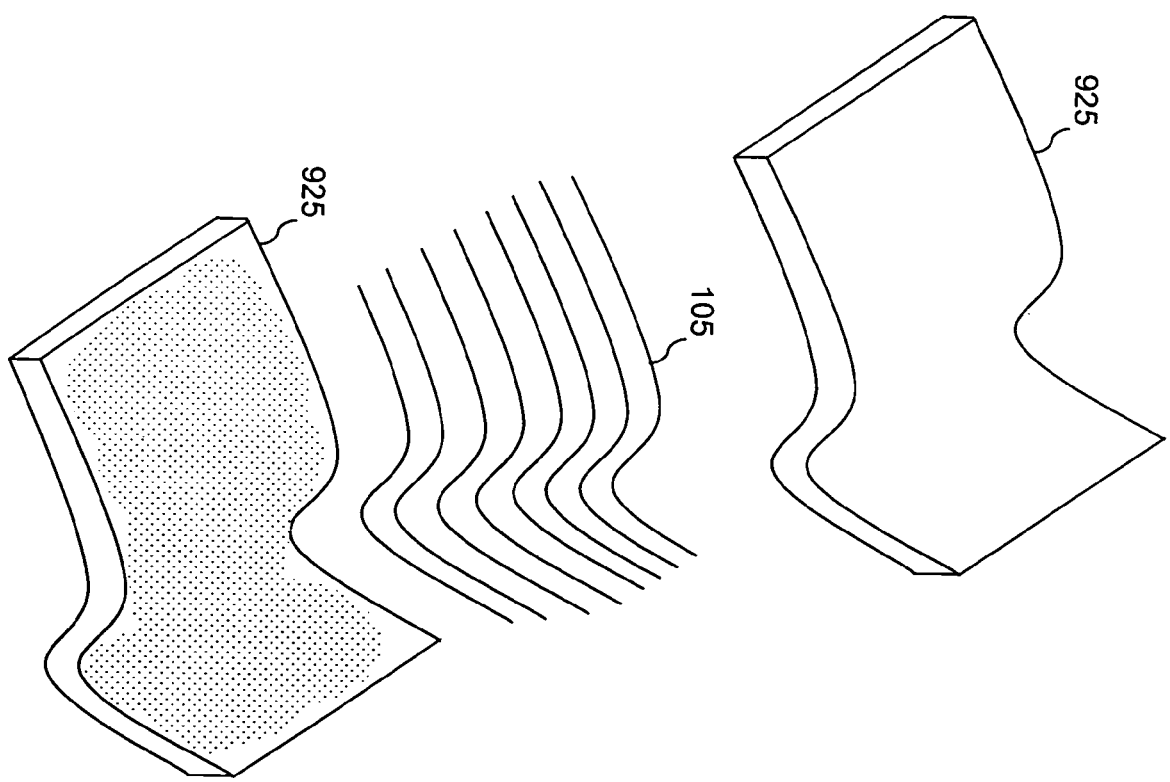
FIG. 9 is an exploded view of two contoured BPM layers that have one permeable surface each. These permeable surfaces are positioned to sandwich multiple layers of structural fabric or other reinforcing materials prior to infusion with resin.
Figure 10:
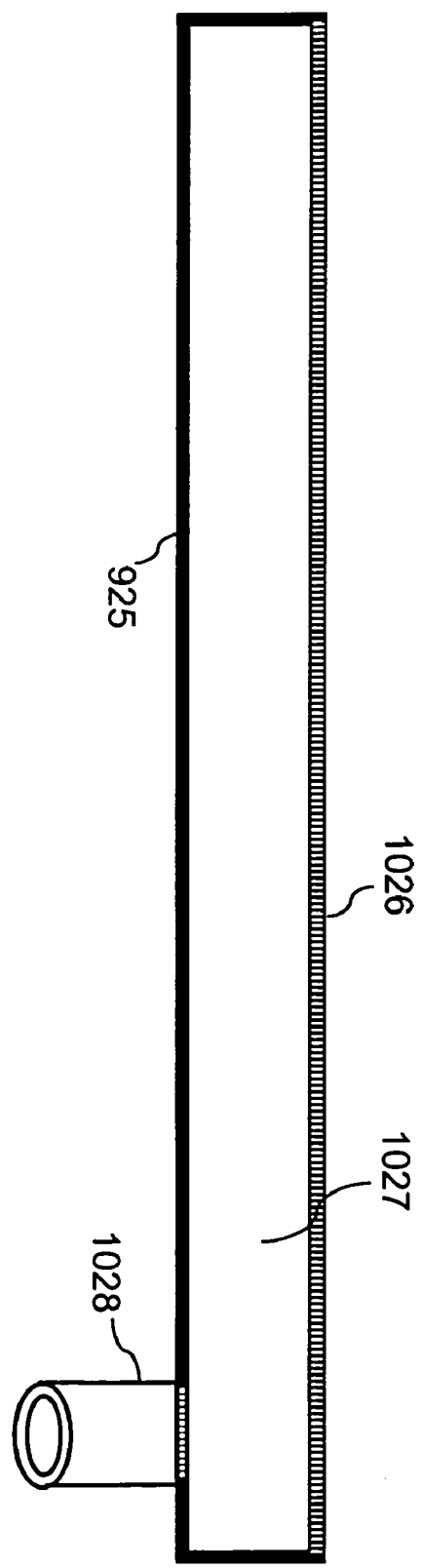
FIG. 10 is a cross-sectional view through a BPM with a one porous surface and a drain or vent tube.

In an exemplary embodiment, one or more laminates or core material 106 or outer lamination or bumper material 123 is configured as a Bladder or Bumper Permeable Material (BPM). The BPM may be any porous material, or may be fabricated to have a porous surface or a perforated or permeable layer (FIG. 9). The BPM body 925 is fabricated, all or in part, from metal, plastic or other impermeable or semi-permeable material, and it has one or more cavities 1027 in the interior (FIG. 10). A perforated or permeable portion 1026 of the BBPM that interfaces with fiber reinforcement or reinforcing material 105 is made such that resin and air or gas can penetrate. A vent tube 1028 is sealed with a valve during all or part of the pressurization period. This vent tube allows the recovery of uncured resin from the BPM. The BPM allows entrapped air or gas in the reinforcing fabric or material to pass into the BPM interior cavity 1027 and be compressed there so that penetration of resin in the reinforcing fabric or material can be enhanced.

The following examples are offered to illustrate selected embodiments of the present invention and do not limit the scope of the invention.

EXAMPLES

The Composite Pressure Resin Impregnation System (ComPRIS) is a new one-step process for bonding or laminating composites together to produce a functionally graded interface. The process allows fiber reinforced polymer (FRP) composites to be rapidly fabricated through the use of applied pressure, and if desired, the resin used in FRP fabrication can also be used to laminate these materials to other FRP materials or to other substrates such as wood, polymers, metals and ceramics. Furthermore, the process can be used to fabricate FRP composites and bond substrates at the same time—making hybrid materials such as glulam beams reinforced with FRP composites in one simple step.

Example 1

The purpose of this study was to investigate procedures (in billet production and fabrication) that may influence the integrity and accelerated durability of the bondlines of ComPRIS specimens. After production of standard billets or articles, these were assessed in accordance with a standard cyclic delamination test (ASTM D1101 as a preliminary screening test for later work with ASTM D2559)

One of the long-term goals for the development of the ComPRIS process includes the production of laminated beams and FRP composite bonded laminated beams. As such, wood-to-wood fabrication was studied as well as FRP composite to wood bonding using E-glass unidirectional fibers sandwiched between layers of wood.

Testing was performed in accordance with ASTM D1101 (*Integrity of Adhesive Joints in Structural Laminated Wood Products for Exterior Use*). This ASTM standard test is an accelerated aging method used for the screening of materials in preliminary studies.

1.1 Procedures 1.1a Billet Fabrication

Four (4) billets were fabricated using the ComPRIS process shown as outlined generally in FIG. 1. All billets contained three (3) layers of freshly planed 18 mm×120 mm×305 mm flat sawn southern yellow pine sapwood boards. The boards were free of defects and were conditioned to a moisture content of 10-12%. Ten (10) layers of E-glass unidirectional woven fabric (VEW 260 from BTI-Saint Gobain) were placed in between the two bottom boards. Nothing was placed in between the two top boards.

The information below provides some of the other parameters that were examined.

Billet A: One (1) layer of Chopped Strand Mat (CSM) was placed on either side of the layers of the E-glass fabric (i.e., between the fiber reinforcement and the wooden board).

Billet B: Control. No modifications were made.

Billet C: Novolac Hydroxymethylated Resorcinal (HMR) coupling agent was applied to each board surface that was to come in contact with either another board or fabric layers. The application rate was approximately 146.5 kg of adhesive per1000 square meters (30 lbs/MSL).

Billet D: Both CSM (as in Billet A) and HMR (as in Billet C) were applied.

The boards (and fabric) were laminated using a clamping method. The exact clamping pressure was not known and was estimated by torque wrench to be 345 kPa.

1.1b COMPRIS Process

Billets were placed into open-top bins (termed 'resinvoirs' in this work) and a vinyl ester resin was introduced. The measured vinyl ester resin used was 7900.4 grams with a 2% catalyst (MEKP). This batch of resin was poured into the resinvoirs in the following quantities:
Billet A: 1.25 L
Billet B: 1.5 L
Billet C: 1.5 L
Billet D: 1.5 L The filled resinvoirs were then placed inside a pressure chamber. The [0012] pressure cylinder reached a pressure of about 965 kPa at approximately 45 minutes after mixing the resin. This level of pressure was held until the resin had cured. Pressure was released after 1.5 hours to examine the gelling of the resin, and pressure was then reapplied overnight to insure adequate resin curing, while the gas pressure in the cylinder bled slowly back to atmospheric pressure.

1.1c ASTM D1101 Process for Accelerated Bond Durability Testing

Three specimens measuring approximately 76 mm in length (along the grain), 120 mm in width, and 57 mm in depth were cut from each billet. The specimens were then placed in a pressure vessel and weighted prior to immersion in water (28° C.). A vacuum of 559 mm-Hg was drawn and held for 30 minutes. The vacuum was then released, and a pressure of 517 kPa was applied and held for 2 hours. At that time, the specimens were placed in an oven (68° C.) overnight.

After drying, digital images were taken of the specimens. Delamination measurements were then recorded through analysis of the images. Digital imaging of the specimens took less time than manually measuring the delamination, resulting in less moisture uptake and subsequent swelling taking place before analysis. For each specimen, six (6) bondlines were investigated; three (3) on each side (wood/wood, wood/FRP, and FRP/wood).

After evaluation of delamination percentages as per the ASTM standard, selected samples were destructively sampled to evaluate the wet-out of the E-glass fiber reinforcement layers and the penetration of the wood laminates with resin.

1.2 Results

Table 1 reports resin uptake for each billet. Uptake values are overestimated as the post-ComPRIS weights included cured resin on the outside of the billet itself (a problem that can be avoided once the resin quantities have been optimized). The mass of the resin added to each "resinvoir" initially is an estimate based upon a density of 1.13 g/cc.

TABLE 1

| Billet | Approx. Wgt. of resin added (g) | Initial Wgt (g) Wood | Initial Wgt (g) Wood/Fabric | Post-ComPRIS wgt (g) | Resin Uptake (g) |
|---|---|---|---|---|---|
| | 1412.5 | 1073.3 | 1405.4 | 2408.2 | 1002.8 |
| | 1695 | 1104.4 | 1426.1 | 2541.9 | 1115.8 |
| | 1695 | 1125.5 | 1448 | 2511.6 | 1063.6 |
| | 1695 | 1085.8 | 1423.2 | 2547.5 | 1124.3 |

Table 2 reports the initial weights of the specimens and the post-drying weights of the specimens after the vacuum/pressure soak. This was needed because the ASTM standard states that the specimens are ready for analysis once they have been dried to within 15% of the initial weight(s).

TABLE 2

| Specimen | Initial Wgt. (g) | Post-Drying Wgt. (g) | Difference (%) |
|---|---|---|---|
| A1 | 573.8 | 562.9 | 1.9 |
| A2 | 572.7 | 562 | 1.9 |
| A3 | 585.4 | 576 | 1.6 |
| B1 | 631.5 | 627.3 | 0.7 |
| B2 | 618.7 | 613.1 | 0.9 |
| B3 | 634.6 | 630.6 | 0.6 |
| C1 | 618.6 | 611 | 1.2 |
| C2 | 616.5 | 608.3 | 1.3 |
| C3 | 616.8 | 609.5 | 1.2 |
| D1 | 631.7 | 625 | 1.1 |
| D2 | 619.6 | 611.9 | 1.2 |
| D3 | 613.2 | 605.1 | 1.3 |

In all cases the ComPRIS process resulted in a high quality FRP layer with low void content, complete wet-out, high fiber volume fraction, and consistent thickness was fabricated. Penetration of the resin into the wood was also observed, effectively producing a functionally graded bondline integrating the FRP layer and the wood. Production of this type of graded bondline is not possible in conventional gluing processes because the resin will not penetrate into the relatively impermeable wood substrate unless pressure is applied.

Table 3 reports a summary of the delamination analysis.

TABLE 3

| Billet | Specimen | Wood/Wood Variable | Wood/Wood Delamination (%) | Wood/FRP Variable | Wood/FRP Delamination (%) | FRP/Wood Variable | FRP/Wood Delamination (%) |
|---|---|---|---|---|---|---|---|
| A | 1 | — | 71.9 | CSM* | 8.3 | CSM* | 15.5 |
| | 2 | — | 77.0 | CSM* | 3.8 | CSM* | 0.0 |
| | 3 | — | 96.8 | CSM* | 42.1 | CSM* | 19.9 |
| | | Mean | 81.9 | Mean | 18.1 | Mean | 11.8 |

TABLE 3-continued

| Billet | Specimen | Wood/Wood Variable | Wood/Wood Delamination (%) | Wood/FRP Variable | Wood/FRP Delamination (%) | FRP/Wood Variable | FRP/Wood Delamination (%) |
|---|---|---|---|---|---|---|---|
|  |  | Std. Dev. | 13.2 | Std. Dev. | 20.9 | Std. Dev. | 10.5 |
| B | 1 | — | 55.7 | — | 0 | — | 3 |
|  | 2 | — | 74 | — | 19.4 | — | 0 |
|  | 3 | — | 82.5 | — | 21.7 | — | 0 |
|  |  | Mean | 70.7 | Mean | 13.7 | Mean | 1.0 |
|  |  | Std. Dev. | 13.7 | Std. Dev. | 11.9 | Std. Dev. | 1.7 |
| C | 1 | HMR | 16.3 | HMR | 5 | HMR | 0 |
|  | 2 | HMR | 4.6 | HMR | 0 | HMR | 0 |
|  | 3 | HMR | 0 | HMR | 1.7 | HMR | 0 |
|  |  | Mean | 7.0 | Mean | 2.2 | Mean | 0.0 |
|  |  | Std. Dev. | 8.4 | Std. Dev. | 2.5 | Std. Dev. | 0.0 |
| D | 1 | HMR | 5.6 | HMR/CSM* | 11 | HMR/CSM* | 0 |
|  | 2 | HMR | 0 | HMR/CSM* | 23.8 | HMR/CSM* | 0 |
|  | 3 | HMR | 0 | HMR/CSM* | 4.7 | HMR/CSM* | 0 |
|  |  | Mean | 1.9 | Mean | 13.2 | Mean | 0.0 |
|  |  | Std. Dev. | 3.2 | Std. Dev. | 9.7 | Std. Dev. | 0.0 |

CSM was only placed in between the fiber reinforcement and wood laminations. It was not placed in between the wood-wood laminations.

HMR treatment greatly improved the wood-wood bonds (when compared to those specimens without HMR-primer). In four out of the six wood-wood bondlines (with HMR primer), delamination was less than 5% (which is the ASTM defined threshold level used to determine an acceptable glue line). None of the bondlines without HMR primer were acceptable at the 5% threshold level. This clearly shows what has been shown in other studies—HMR priming is useful for exterior use bondline production in FRP composite bonding to wood.

The wood-FRP composite bondlines of the control samples show that four (4) out of the six (6) bondlines passed the ASTM standard criteria. The two bondlines the "failed", however, had substantial delamination (19 and 22%).

The results show that use of CSM (alone) resulted in higher delamination in the specimens tested. Only specimen #2 contained "passing" bondlines. The four other bondlines showed a delamination of greater than 5%.

When HMR was applied to the wood surfaces, the resultant bondlines of FRP and wood were the best of any treatments tested. All six (6) bondlines passed the ASTM standard threshold level.

As mentioned above, the use of CSM in this preliminary study does not show any evidence of preventing delamination. When used in conjunction with HMR, delamination rates were higher than when HMR was used alone. While four (4) out of six (6) bondlines appeared to be adequate, the overall average delamination in this scenario was greater than when HMR was used without CSM.

The present results demonstrate the complete penetration of E-glass fabric with resin to produce a high-quality FRP composite sheet bonded to wood using the ComPRIS process. Penetration of resin into the wood as well as the E-glass fabric produced a functionally graded interphase rather than a discrete bondline interface as occurs in convention gluing of pre-consolidated FRP composite sheets to wood other substrates (for example). This type of graded interphase cannot be achieved by other process for FRP manufacture including SCRIMP™, VARTM, or wet lay-up. The semipermeable wood substrate functions as a buffer or a bladder, as do other permeable or semi-permeable materials in the ComPRIS process. Gas within these materials, and any entrapped gas that does not escape from the edges of the article being fabricated during the resin infiltration process, can be taken into the wood, or other permeable or semipermeable substrate and remain there until infiltration and resin cure is achieved. That semipermeable materials such as wood will function in this manner has long been known in the wood preservative industry. The ComPRIS process therefore embodies significant processing advantages over these other manufacturing methods. In addition, the process is enclosed to limit VOC emission and can be performed in a single step rather than using multiple steps to fabricate the FRP composite and then laminate the final product.

Example 2

2.1 Procedure

Billets of 10 laminates of unidirectional E-glass fabric (VEW 260 from BTI-Saint Gobain) placed in between the southern yellow pine lumber, were fabricated as described in Example 1 for ComPRIS production. A vinyl ester resin (Derakane 411-C50) was used in all tests. For all tests, the resin was mixed with a 2% (by weight) catalyst (2-Butanone peroxide, manufactured by Aldrich Chemical Corporation).

The boards used were 1"×6" (nominal), and measured 24" in length. Billets were also fabricated using the same materials but using the SCRIMP™ process for comparative purposes in later testing. From both the ComPRIS and SCRIMP™ billets, small cross sections of material were cut and these sections were prepared for viewing using electron microprobe analysis. A model Cameca SX100 Electron microprobe unit was used with an accelerating voltage of 15 kV and 10 nanoamps in the backscatter mode. Images were captured digitally to allow a comparative examination of the bondline and the quality of resin infiltration in both wood and FRP material.

2.2 Results

Figure 14:
FIG. 14 is a micrograph of a composite material of the invention, showing an essentially uniform cured resin that is essentially free of microvoids. The image was acquired with an electron microprobe in backscatter mode as discussed in Example 3. The fiber reinforcement visible in the micrograph is approximately 20 µm in diameter.
Figure 15:
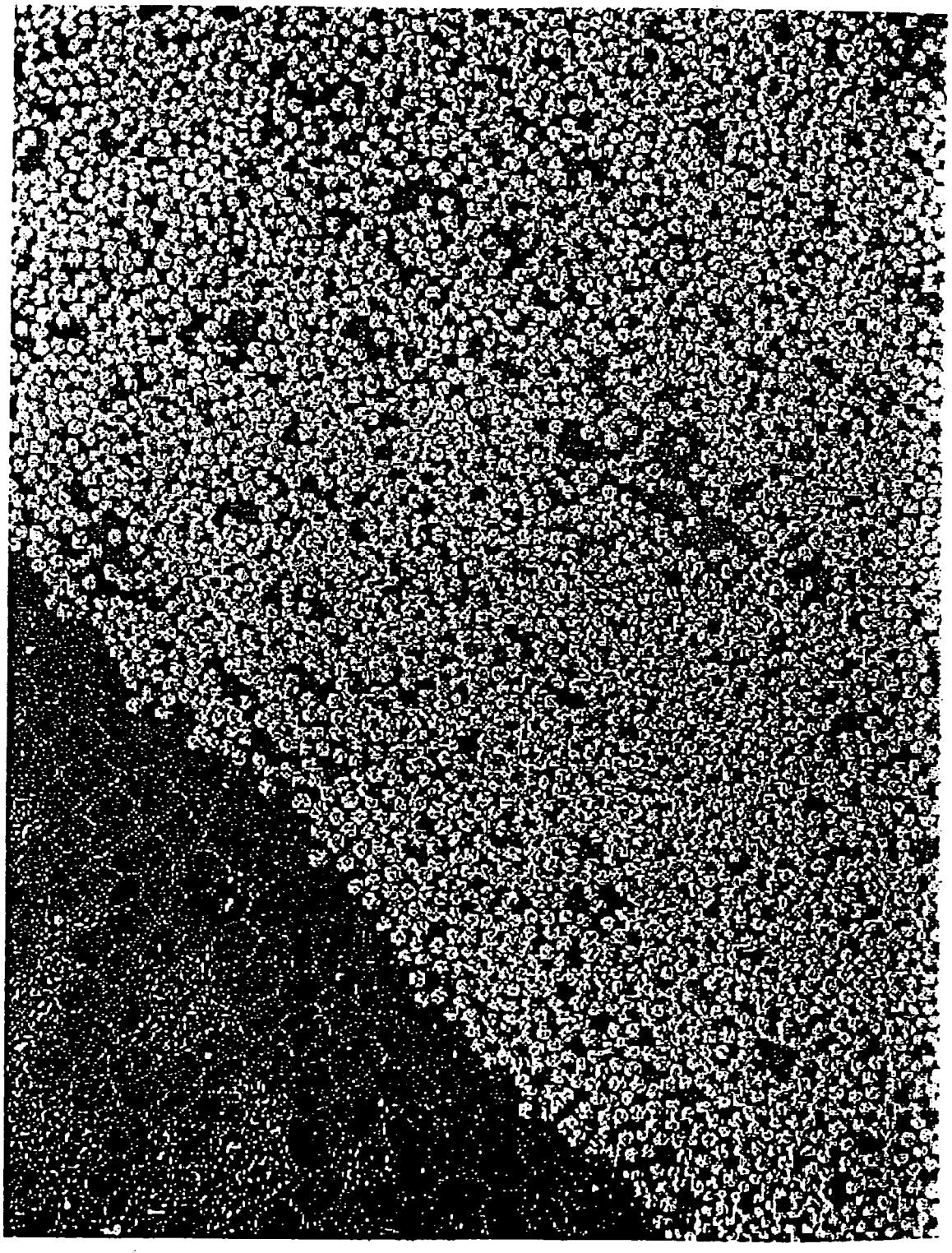
FIG. 15 is a micrograph of a composite material of the invention, showing an essentially uniform cured resin that is essentially free of microvoids. The image was acquired with an electron microprobe in backscatter mode as discussed in Example 3. The fiber reinforcement visible in the micrograph is approximately 20 µm in diameter.
Figure 16:
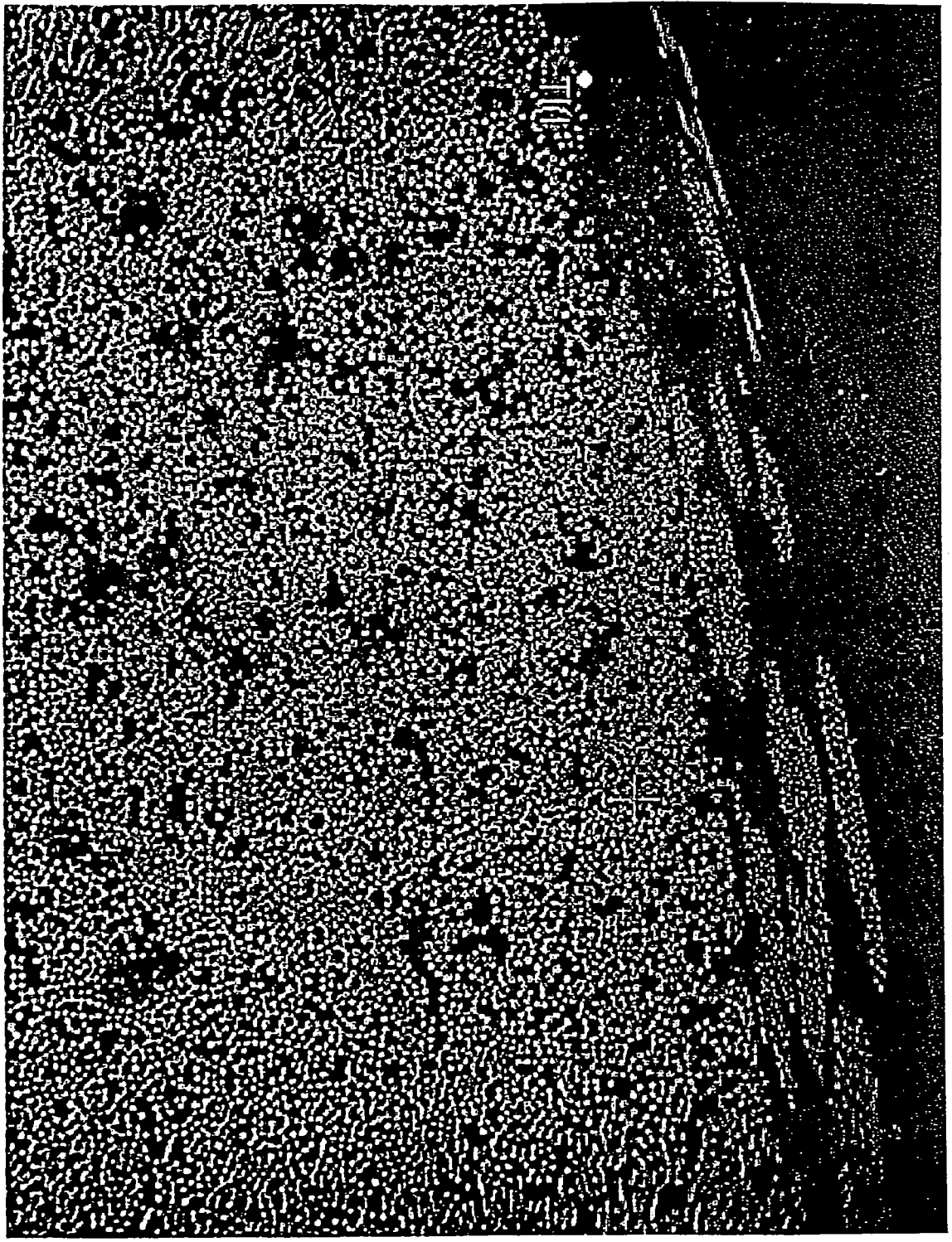
FIG. 16 is a micrograph of a composite material prepared by a representative vacuum-based infusion process (SCRIMP™), showing the microvoids that are characteristically formed by such vacuum-based processes. The image was acquired with an electron microprobe in backscatter mode as discussed in Example 3. The fiber reinforcement visible in the micrograph is approximately 20 µm in diameter.
Figure 17:
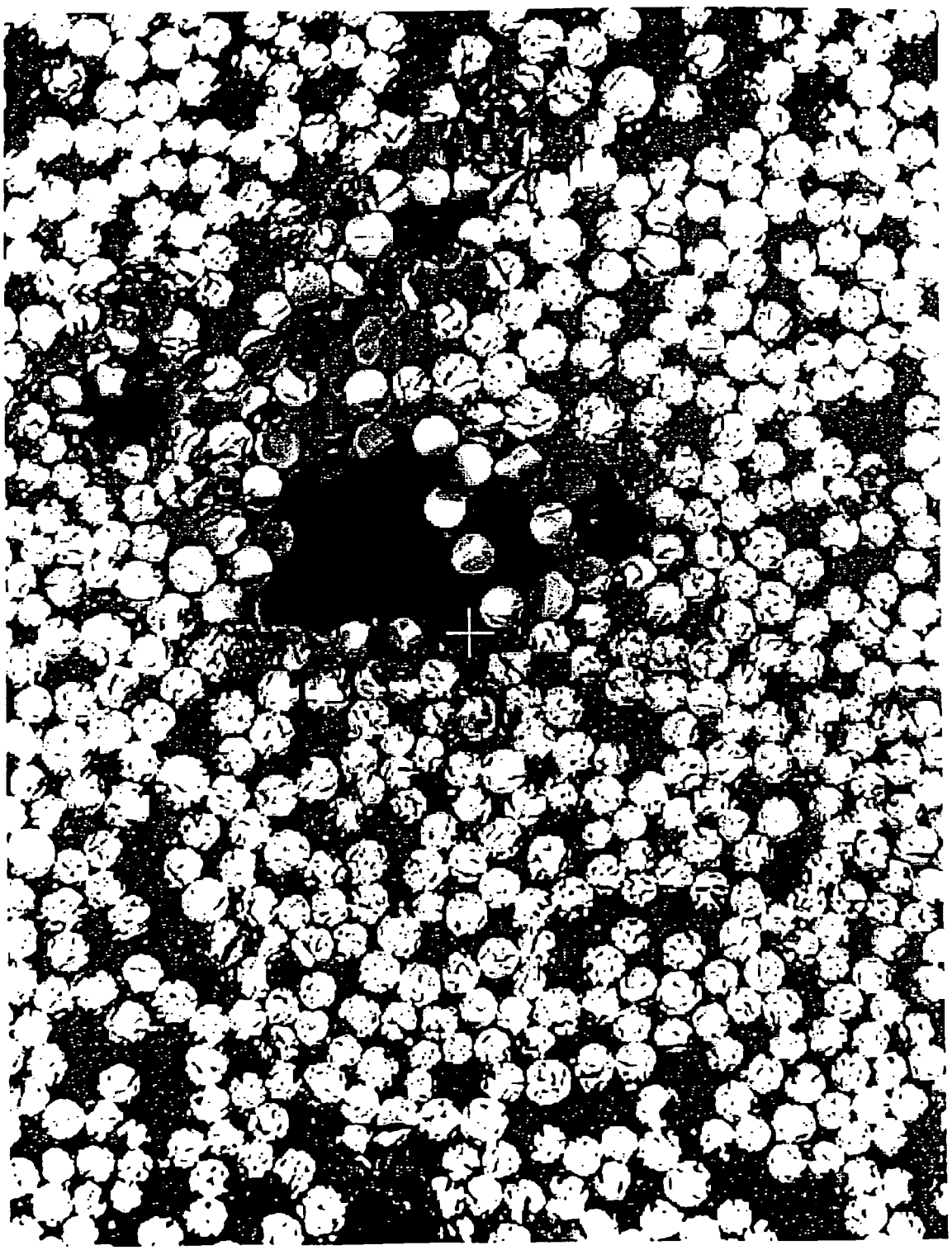
FIG. 17 is a micrograph of a composite material prepared by a representative vacuum-based infusion process (SCRIMP™), showing the microvoids that are characteristically formed by such vacuum-based processes. The image was acquired with an electron microprobe in backscatter mode as discussed in Example 3. The fiber reinforcement visible in the micrograph is approximately 20 µm in diameter.

Observations of the SCRIMP™ samples showed that the cured resin surrounding the glass fibers of the FRP and the resin in the interface between the wood and the FRP layer has voids or hollows (FIG. 14 and FIG. 15). These microvoids were consistent with those that occur when solvent ablation occurs in resins, and the ablation and voids were consistent with those that occur in other SCRIMP™ materials. Ablation of solvents in resins will occur when a vacuum applied during the SCRIMP™ process reduces the vapor pressure of uncured resin solvent(s) below a critical point, and a liquid solvent in the resin then 'boils' or volatilizes producing a void in the infiltrating or curing resin. The microvoids observed were often too small to be viewed with the eye or with a hand lens, and ranged in size from a few microns to, in some cases, several hundred microns in length or width. The microvoids were usually approximately spherical but often with undulating or rough edges, and in some cases contained sections of glass fiber. But the voids could also be elongated, usually oriented in the direction of the fabric layering.

Figure 12:
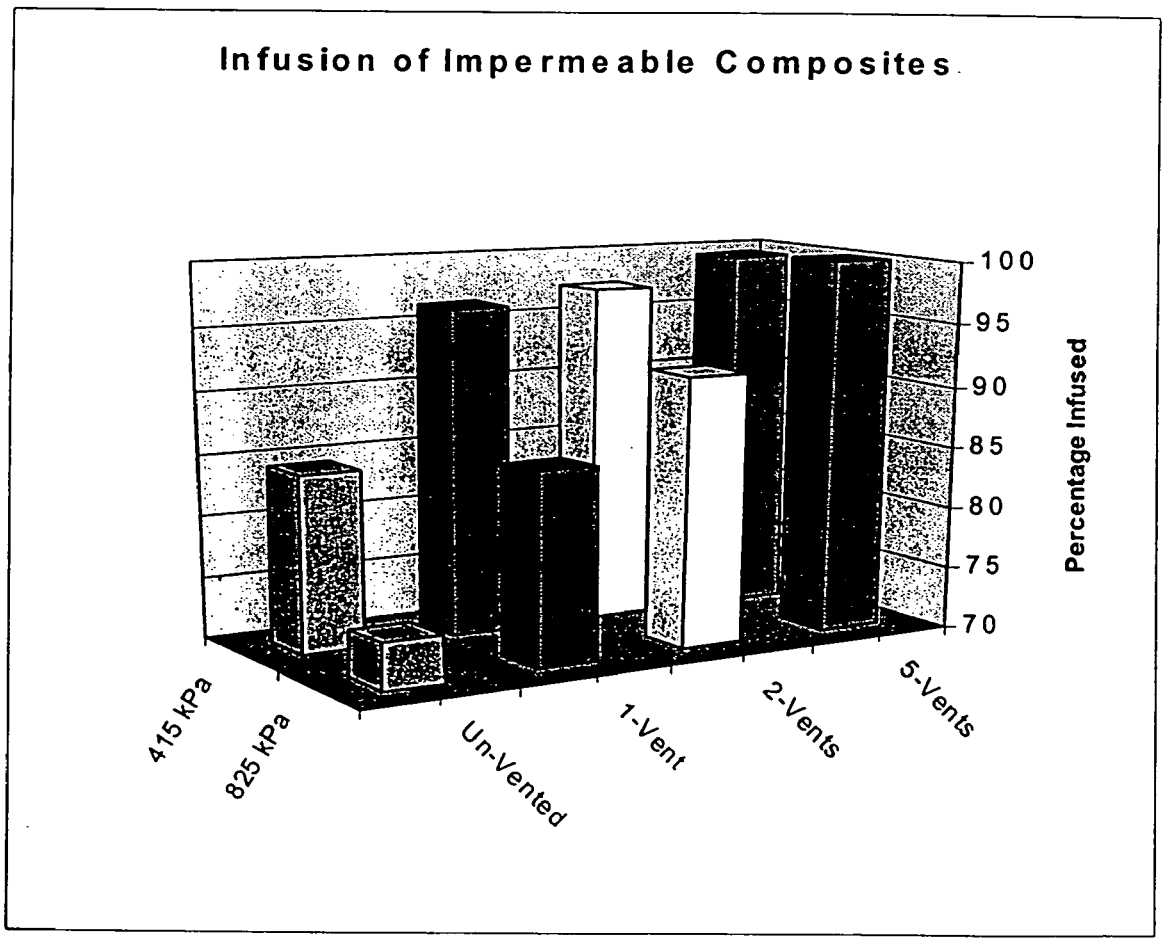
FIG. 12 is a graphical presentation of the average penetration of resin into fabric laminates (in percent). The data shown represent the average of multiple replicates of each test.
Figure 13:
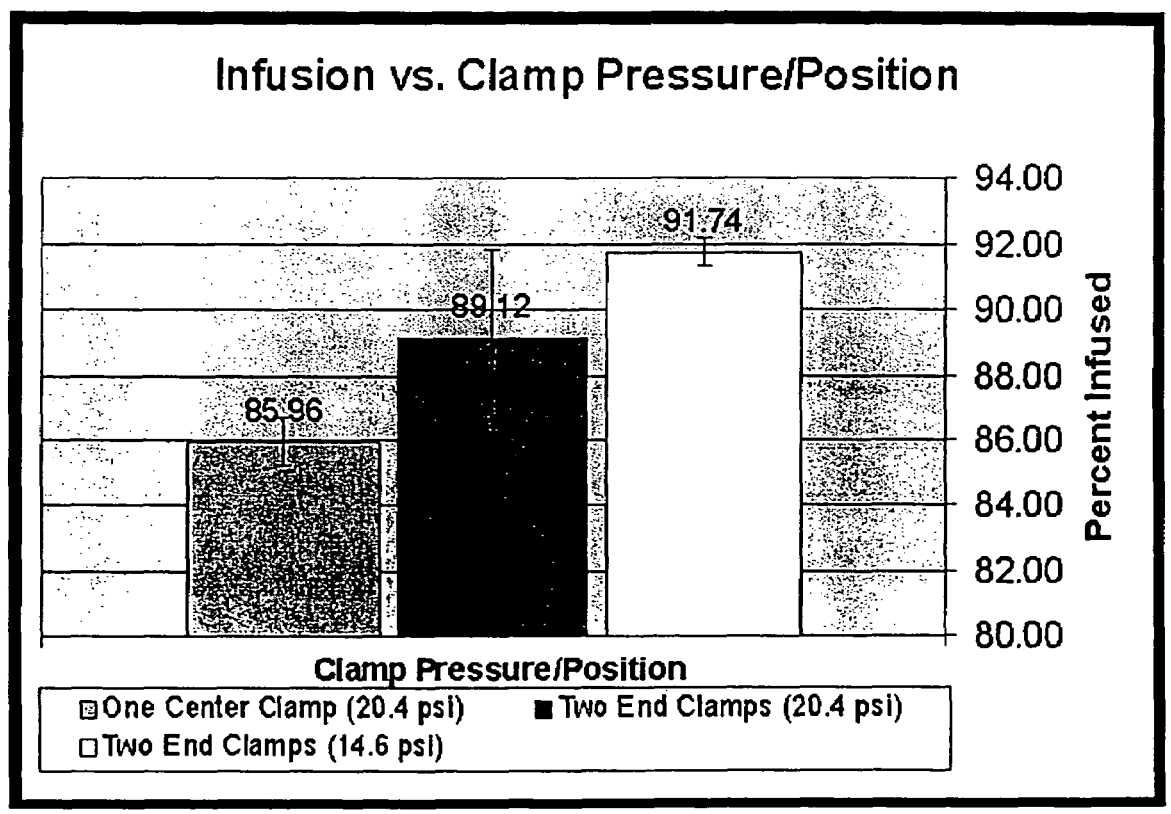
FIG. 13 is a graphical presentation of the effect of clamping position and pressure on a model infusion process.

In contrast, no voids of this nature were noted in the ComPRIS samples (FIG. 12 and FIG. 13). Resin penetration was uniform and complete. Penetration of the resin into the wood was also much more complete than in the SCRIMP™ samples.

A comparison of the glass fiber density of SCRIMP™ samples and ComPRIS samples was also made. In the SCRIMP™ samples gaps between fibers were often observed. Unlike the gas voids discussed above in the SCRIMP™ material, the gaps were filled with resin, but there was no fiber content in this resin. The interface between the wood and the glass layer was also uneven in the SCRIMP™ samples, with a greater distance generally observed between the wood and the glass in the SCRIMP™ samples. In contrast, the ComPRIS material displayed a uniform glass fiber density with no gaps and no voids. The interphase region was also better consolidated and even, consistent with the margin of the wood interface.

Example 3

3.1 Procedure

Billets comprised of two layers of polyester/polyethylene panels material sandwiched around 10 layers of unidirectional E-glass fabric (VEW 260 from BTI-Saint Gobain) were produced using the ComPRIS process as described above in Examples 1 and 2. In this work however, one of the panels, being of wood plastic lumber (an impermeable material), were ripped to a depth of 5 mm on one face by making 3 equally distant saw kerfs along the length of the material. These kerfed faces were positioned to interface with the fabric layers, to relieve the build up of entrapped gas within the samples during ComPRIS fabrication. A vinyl ester resin (Derakane 411-C50) was used in all tests. For all tests, the resin was mixed with a 2% (by weight) catalyst (2-Butanone peroxide, manufactured by Aldrich Chemical Corporation).

After curing under pressure, the billets were removed, sectioned along their length by ripping a thin central strip from the length of each billet. The resulting two sections of the billets were cut to produce shear block samples according to ASTM D 905-94 and tested according to this standard also.

3.2 Results

Penetration of the fabric was uniform throughout the billet; with occasional small voids seen near the site of a cross-weave (stitch) in the fabric. The kerfing of the impermeable panel material allowed any entrapped gas to readily escape from the edges of the panels during the infiltration of the resin.

Shear block results showed that shear strength values exceeded that of 'control' samples by up to 2 times (Table 4) (For this study, the control samples were identical to the tested samples except that no 'kerfing' was done.). The 'kerfed' shear blocks possessed an average shear strength of over 1,000 psi (suitable for structural applications), while the control specimens posses an average shear strength of less than 500 psi. Additionally, the 'kerfed' blocks almost consistently showed 100% wood failure when tested, while the control group (on average) had nearly 90% wood failure.

Clearly, when impermeable substrates are 'kerfed' superior bonds are formed. These 'kerf' lines serve as a pathway to release any entrapped gas from the article. Although this may be unneeded or less critical for permeable substrates such as wood, the results of this test show that compressed gas between impermeable layers can have detrimental effects on the integrity of adhesive bondlines. Other studies have shown that 'venting' of impermeable substrates is one method of improving resin penetration (see Example 4 below). 'Kerfing' or other texturing or embossing of article component surfaces may prove to be a faster, and therefore, more economical approach to relieving problems associated with entrapped gas in some ComPRIS embodiments.

TABLE 4

| | Shear Stress (lbf/sq in) | Wood Failure (%) |
|---|---|---|
| | Un'kerfed' | |
| Average = | 481.58 | 88.85 |
| stdev = | 69.21 | 7.52 |
| COV % = | 14.37 | 8.47 |
| | Kerfed' | |
| Average = | 1095.4 | 99.57 |
| stdev = | 202.0 | 1.44 |
| COV % = | 18.4 | 1.45 |

Shear stress and percentage wood failure for shear blocks comprised of wood plastic composites (WPC) bonded with the ComPRIS process.

Example 4

4.1 Procedure

Billets, comprising 2 laminates of plastic-lumber (Correct Building Products, LLC, Biddeford, Me.) and 10 laminates of unidirectional E-glass fabric (VEW 260 from BTI-Saint Gobain) placed in between the lumber, were fabricated for the tests. The boards used were 1"×6" (nominal), and measured 24" in length.

Variables studied included both applied pressure, and the clamping pressure (of the billets). One set of billets was subjected to an applied pressure of 825 kpa (120 psi). These samples were clamped to a pressure of approximately 138 kpa (20 psi). Another set of billets was subjected to an applied pressure of 415 kPa (60 psi) and was screw-laminated to a pressure of 7-21 kPa. These clamp processes were performed to consolidate the fabric mats sandwiched between the lumber, and occurred prior to submersion of the billet in resin and the application of pressure to the billet and resin.

For each regimen, a total of 20 billets were tested. Five billets each were tested with: no vents (control), 1 vent, 2 vents, and 5 vents. The vents consisted of a ¼-⅜" hole drilled completely through the top plastic-lumber board. A tight-fitting piece of copper pipe was placed in the hole, and any gaps were sealed. The copper pipe was connected to high strength hose that was then ported to atmospheric pressure. A valve controlled the volume of gas released. See, FIG. 2 and FIG. 5.

Billets were placed into open-top bins (termed 'resinvoirs' in this work) and a vinyl ester resin (Derakane 411-C50) was introduced. For all tests, the resin was mixed with a 2% (by weight) catalyst (2-Butanone peroxide, manufactured by Aldrich Chemical Corporation).

The filled resinvoirs were then placed inside a pressure vessel and vent hoses (when applicable) were attached to the atmospheric port. Pressure was then applied to the vessel. When the appropriate pressure was reached, the valve allowing the venting of any compressed gas within the billet was opened (when applicable), and then closed after the approximate volume of gas within the fabric laminates had been released. Applied pressure was maintained for 2 hours—the time it took for the resin to gel (as determined by initial tests).

After curing (24 hours), the newly formed FRP plate was split from the billet. An analysis of the penetration of the resin was done with the imaging software program, ImageJ.

4.2 Results

The results of the tests are reported in Table 5, and in graphical form in FIG. 10.

TABLE 5

|  | No Vents | 1-Vent | 2-Vents | 5-Vents |
|---|---|---|---|---|
| 415 kPa | 84.30 (2.91) | 96.42 (1.34) | 97.29 (3.34) | 99.37 (0.60) |
| 825 kPa | 73.71 (17.63) | 85.39 (3.33) | 91.74 (0.47) | 100.00 (0.00) |

Average penetration of resin into fabric laminates (in percent). Values in parentheses are standard deviation values.

Because the clamping pressures between the two different applied pressure regimens differed, the penetration values of the test sets were not compared. Similar trends are observed, however, within each set.

Regardless of clamping pressure or applied pressure, an increased number of vents was found to correlate with an increased amount of penetration of the reinforcement laminates. For example, in the 825 kPa applied pressure regimen, penetration of the reinforcement laminates increased from about 74% to 85%, 92%, and 100% (with zero venting, 1-vent, 2-vents, and 5-vents, respectively).

Figure 11:
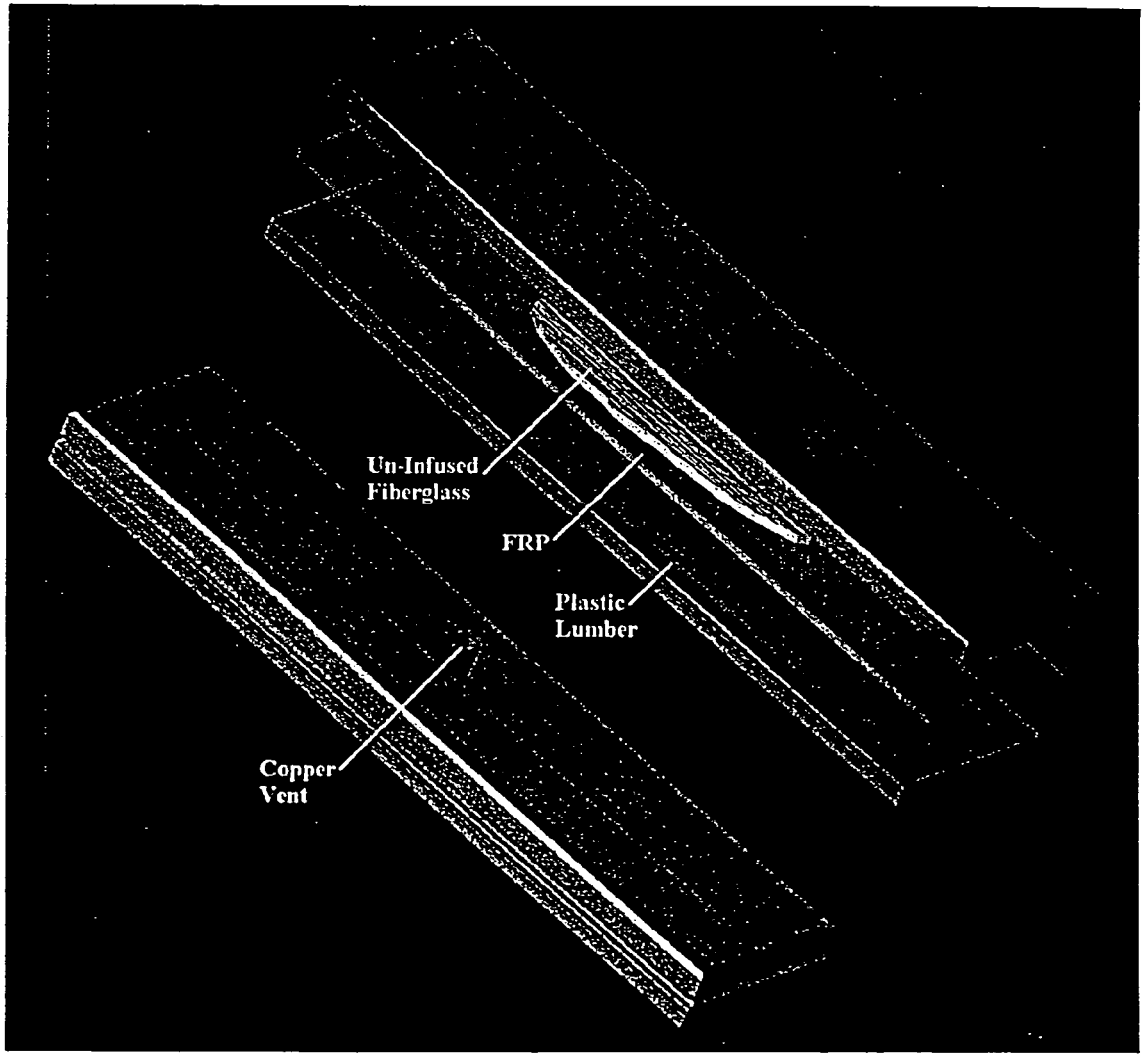
FIG. 11 is an exploded view of a layered construction of fiber reinforcement (E-glass fabric) and consolidated (plastic lumber) materials. The sandwich design is used in Example 2, testing the behavior of fiber-based materials such as wood or fabric laminates bound by consolidated wood-plastic boards or FRP composite laminates.

Clamping pressure can affect the infusion of the fiberglass, as shown in FIG. 11. Too high a clamping was shown to decrease the resin flow causing non-infused areas, while low clamping pressure seems to reduce this problem. Proper distribution of clamping pressure also appeared to play a role in resin penetration/gas displacement. The more clamps, i.e. the less concentrated the clamping force, the greater the percentage of infusion. How this variable affects the integrity and durability of bondlines created by this process is unknown at this time.

Example 5

5.1 Procedure

A prelaminated Douglas fir beam was used to examine the feasibility of the ComPRIS method using a pressure bagging variant. In this process, the Douglas fir beam has 10 layers of unidirectional E-glass fabric (VEW 260 from BTI-Saint Gobain) loosely stapled to the upper surface. The wood and glass billet (article) was then wrapped in peel ply and a pervious conduit e.g., sisal rope, was placed along the length of the fabric to aid in the distribution of resin during the ComPRIS process. Flexible tubes to carry resin to the billet and release gas from the billet were then connected to either end of the pervious conduit. The billet was then inserted in a poly bagging film with the tubes extending. The film was sealed along all edges and around the tubes to produce a loose bag around the billet and the entire unit was placed inside a pressure autoclave. The free end of one tube was submerged in an open pot containing a vinyl ester resin (Derakane 411-C50) and the pot was also placed within the pressure autoclave. The free end of the other tube was connect to a resin trap which in turn connected to a port in the wall of the pressure autoclave to vent to atmosphere. The autoclave was then sealed and pressure applied at 140 psi.

5.2 Results

When pressure was applied, the bagging film was immediately collapsed sealing it to the surface of the billet. At the same time, the autoclave pressure forced resin in the pot to enter the delivery tube and thereby deliver resin to the billet. The pressure differential from one end of the billet to the other caused the resin to flow along the pervious conduit and into the fabric layers. Resin was distributed evenly through the fabric and then flowed to the distal end to the exit tube. Excess resin was then trapped in the resin trap. A uniform distribution of resin (without vacuum induced imperfections) was produced in this manner.

Example 6

6.1 Procedure

A section of open cell foam sandwiched with wood veneer and shaped as a turbine blade was wrapped in 4 layers of unidirectional woven E-glass fabric reinforcement (style VEW 260 from BTI-Saint Gobain) loosely stapled to the upper surface. Staples were used to fasten the E-glass fabric to the surface of the foam and consolidate the fabric to the foam. This unit was wrapped in peel ply and inserted into a polyethylene bag which was then partially filled with a catalyzed vinyl ester resin (Derakane 411-C50). Air in the bag was pushed out, and the bag was then sealed to exclude as much air as possible. The unit was then weighted and submerged in a water bath. The water bath and unit were then sealed inside a pressure treatment autoclave and pressure was applied to simulate the effect of submersion of to a depth of approximately 100 feet below the surface where the hydrostatic pressure exerted was approximately 100× 62.5=6,250 lb per sq ft=43.4 psi. The unit was submerged under pressure for approximately 4 hours to allow the resin to cure, before depressurizing and removal.

6.2 Results

The results indicated that a successful resin infusion was achieved in the majority of the sample. The e-glass shell penetrated well with resin except in one area where a leak in the polyethylene bag allowed water to enter. The closed foam BPM core also penetrated well with resin, however, some areas which contained compressed air by design (the foam core BPM) were not penetrated. The appearance of the cross-sectional area suggested that a substantial interphase adhesive bond had been created.

It is understood that the examples and embodiments described herein are for illustrative purposes only and that various modifications or changes in light thereof will be suggested to persons skilled in the art and are to included within the spirit and purview of this application and are considered within the scope of the appended claims. All publications, patents, and patent applications cited herein are hereby incorporated by reference in their entirety for all purposes.

What is claimed is:

1. A composite article essentially free of microvoids comprising:
    (a) a first permeable substrate layer; and
    (b) a first cured polymer matrix layer in contact with said first permeable substrate layer, comprising:

(i) a cured resin; and
(ii) a reinforcing material in contact with said cured resin,
wherein uncured resin impregnates said first substrate layer using a resin transfer molding process whereby the first contact of the uncured resin and permeable substrate layer occurs under pressure sufficient to create a composite article essentially free of microvoids, the pressure created by applying gas or flowable liquid pressure to a precursor of said article comprising said substrate, an uncured precursor of said cured resin and said reinforcing material.

2. The composite article according to claim 1, wherein said cured resin impregnates said first permeable substrate layer to a depth of from about 1% to about 100% of a cross-section of a porous region of said substrate.

3. The composite article according to claim 1, wherein said gas or flowable liquid pressure is from about 10 psi to about 300 psi.

4. The composite material according to claim 1, wherein said substrate comprises a patterned surface.

5. The composite article according to claim 1, wherein said first amount of resin is a preselected amount.

6. The composite article according to claim 1, further comprising a second substrate in contact with said polymer matrix layer.

7. The composite article according to claim 6, wherein a second amount of said cured resin impregnates said second substrate.

8. The composite article according to claim 1, wherein said first substrate layer comprises a first sub-component and a second sub-component in a layered arrangement in which a third amount of said resin is in contact with said first sub-component and said second sub-component.

9. The composite article according to claim 1, wherein said first substrate and said second substrate are the same material or different materials.

10. The composite article according to claim 8, wherein said first sub-component and said second sub-component are the same material or different materials.

11. The composite article according to claim 1, wherein said reinforcing material is a fiber reinforcement that is a member selected from glass-based fiber, mineral-based fiber, carbon-based fiber, aramid-based fiber, natural fiber, metal-based fiber, basalt-based fiber, synthetic organic fiber.

12. The composite article according to claim 1, wherein said substrate layer is a consolidated material that is a member selected from wood products, wood composite products, wood-plastic products, plastic-lumber, wood thermoplastic extruded material, structural composite lumber and engineered wood composites.

13. The composite article according to claim 12, wherein said consolidated material is a member selected from wood-plastic composites, oriented strand board, plywood, laminated veneer lumber, parallel strand lumber.

14. The composite article according to claim 11, wherein said fiber is a member selected from a preform, a woven fabric, a non-woven fabric, stitched fabric, a braid, a roving, a tow, a chopped strand mat, a continuous strand mat, a veil and combinations thereof.

15. The composite article according to claim 1, wherein said cured polymer matrix layer comprises a member selected from a thermoset polymer, thermoplastic polymers and combinations thereof.

16. The composite article according to claim 1, wherein said cured polymer matrix layer comprises a member selected from epoxy resin, urethane resin, polyester resin, phenolic resin, polyvinyl chloride resin, melamine resin, isocyanate resin, resorcinol resin, polyethylene resin, polypropylene resin, and nylon resin and combinations thereof.

17. The composite article according to claim 6, wherein said polymer matrix layer forms a graded interphase between said first substrate and said second substrate.

18. The composite article according to claim 1, wherein said polymer matrix layer has a polymer matrix layer structural performance and said first substrate has a substrate structural performance, and said composite article has a composite article structural performance that is greater than the sum of said substrate structural performance and said polymer matrix layer structural performance.

19. The composite article according to claim 1, wherein a member selected from said first substrate, said reinforcing material, said first polymer matrix layer and combinations thereof further comprise a member selected from a preservative, a fire retardant material and combinations thereof.

* * * * *